(12) United States Patent
Ishihara et al.

(10) Patent No.: US 10,154,208 B2
(45) Date of Patent: Dec. 11, 2018

(54) IMAGING DEVICE, IMAGING METHOD, AND ON-BOARD IMAGING SYSTEM

(71) Applicant: Maxell, Ltd., Kyoto (JP)

(72) Inventors: Tomokazu Ishihara, Tokyo (JP); Yuuichi Nonaka, Tokyo (JP); Akihito Nishizawa, Tokyo (JP); Junji Shiokawa, Tokyo (JP)

(73) Assignee: Maxell, Ltd., Kyoto (JP)

( * ) Notice: Subject to any disclaimer, the term of this patent is extended or adjusted under 35 U.S.C. 154(b) by 188 days.

(21) Appl. No.: 14/908,276

(22) PCT Filed: Jul. 31, 2013

(86) PCT No.: PCT/JP2013/070685
§ 371 (c)(1),
(2) Date: Jan. 28, 2016

(87) PCT Pub. No.: WO2015/015580
PCT Pub. Date: Feb. 5, 2015

(65) Prior Publication Data
US 2016/0173790 A1    Jun. 16, 2016

(51) Int. Cl.
*H04N 5/33* (2006.01)
*H04N 9/04* (2006.01)
*H04N 9/67* (2006.01)

(52) U.S. Cl.
CPC ............ *H04N 5/332* (2013.01); *H04N 9/045* (2013.01); *H04N 9/67* (2013.01)

(58) Field of Classification Search
CPC ........... H04N 5/332; H04N 9/67; H04N 9/045
See application file for complete search history.

(56) References Cited

U.S. PATENT DOCUMENTS

| 7,551,206 B2 | 6/2009 | Fuyuki |
| 9,200,895 B2 | 12/2015 | Ichitani et al. |

FOREIGN PATENT DOCUMENTS

| JP | 4251317 A | 4/2009 |
| JP | 2012-142832 A | 7/2012 |
| JP | 2013-121132 A | 6/2013 |
| WO | 2012/067028 A1 | 5/2012 |

OTHER PUBLICATIONS

International Search Report of PCT/JP2013/070685.

*Primary Examiner* — Padma Haliyur
(74) *Attorney, Agent, or Firm* — Mattingly & Malur, PC

(57) ABSTRACT

The imaging device is characterized by comprising an image sensor comprising pixels with sensitivity to the visible range and near infrared range and pixels with sensitivity to the near infrared range, a color reproduction processing unit that performs color reproduction processing using signals from the pixels with sensitivity to the visible range and near infrared range and signals from the pixels with sensitivity to the near infrared range among the output signals of the image sensor, a visible light amount calculating unit that calculates the signal quantity in the visible range using the output signal of the image sensor, and a control unit that controls the color reproduction processing unit so that the color reproduction processing is performed on the basis of the signal quantity in the visible range calculated by the visible light amount calculating unit.

15 Claims, 17 Drawing Sheets

F I G. 3
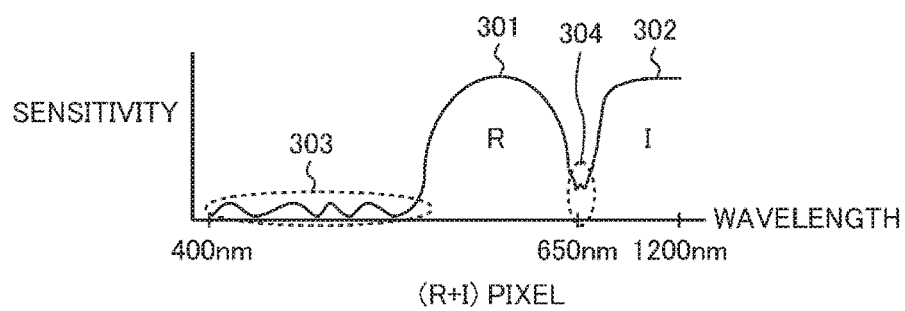
(R+I) PIXEL
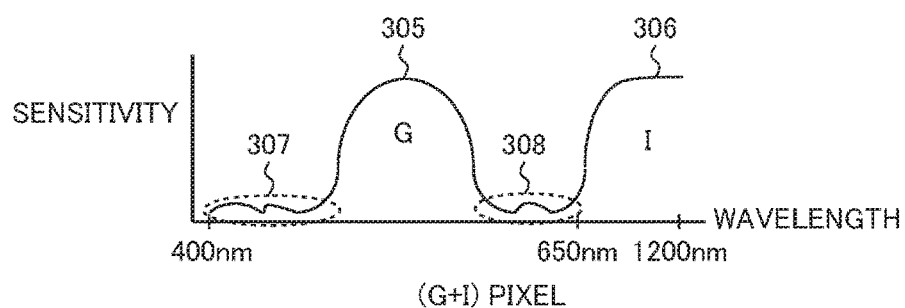
(G+I) PIXEL
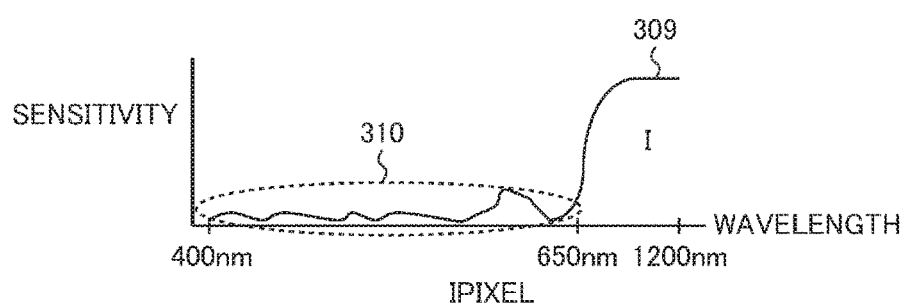
IPIXEL
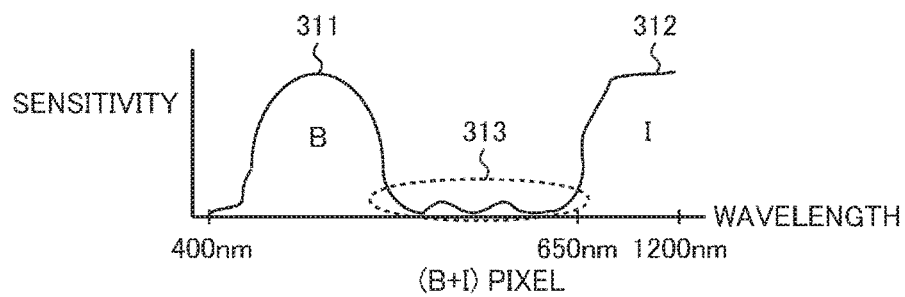
(B+I) PIXEL F I G. 1 1
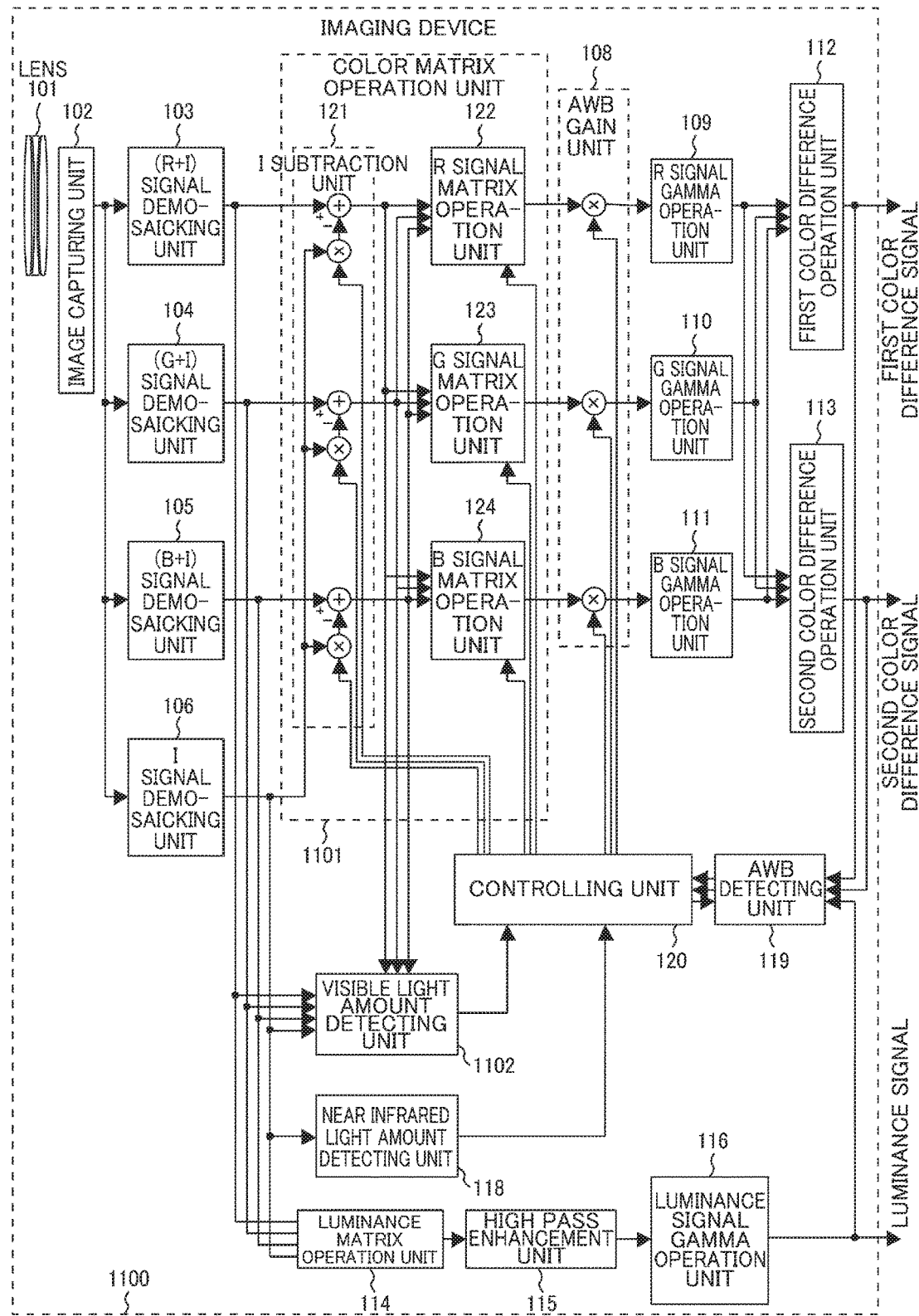

F I G. 1 4
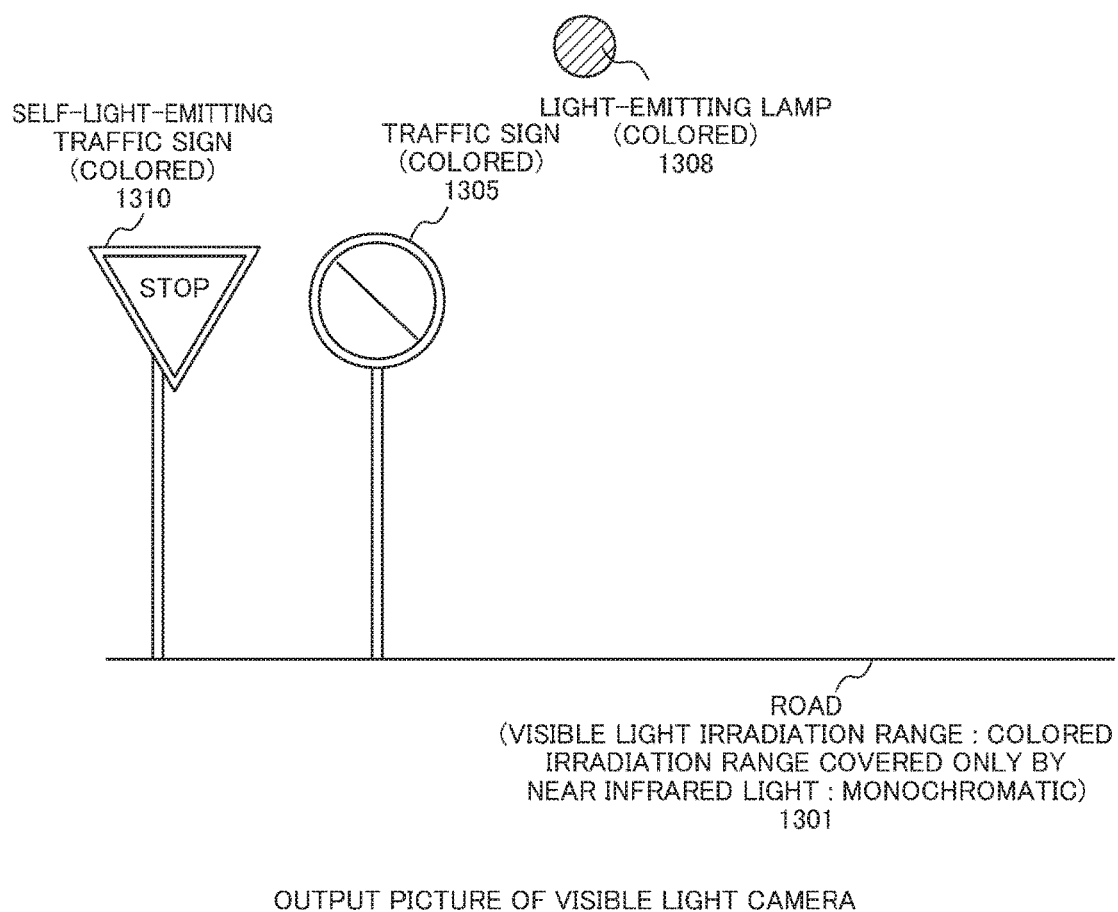
OUTPUT PICTURE OF VISIBLE LIGHT CAMERA

OUTPUT PICTURE OF NIGHT VISION CAMERA

F I G. 1 6
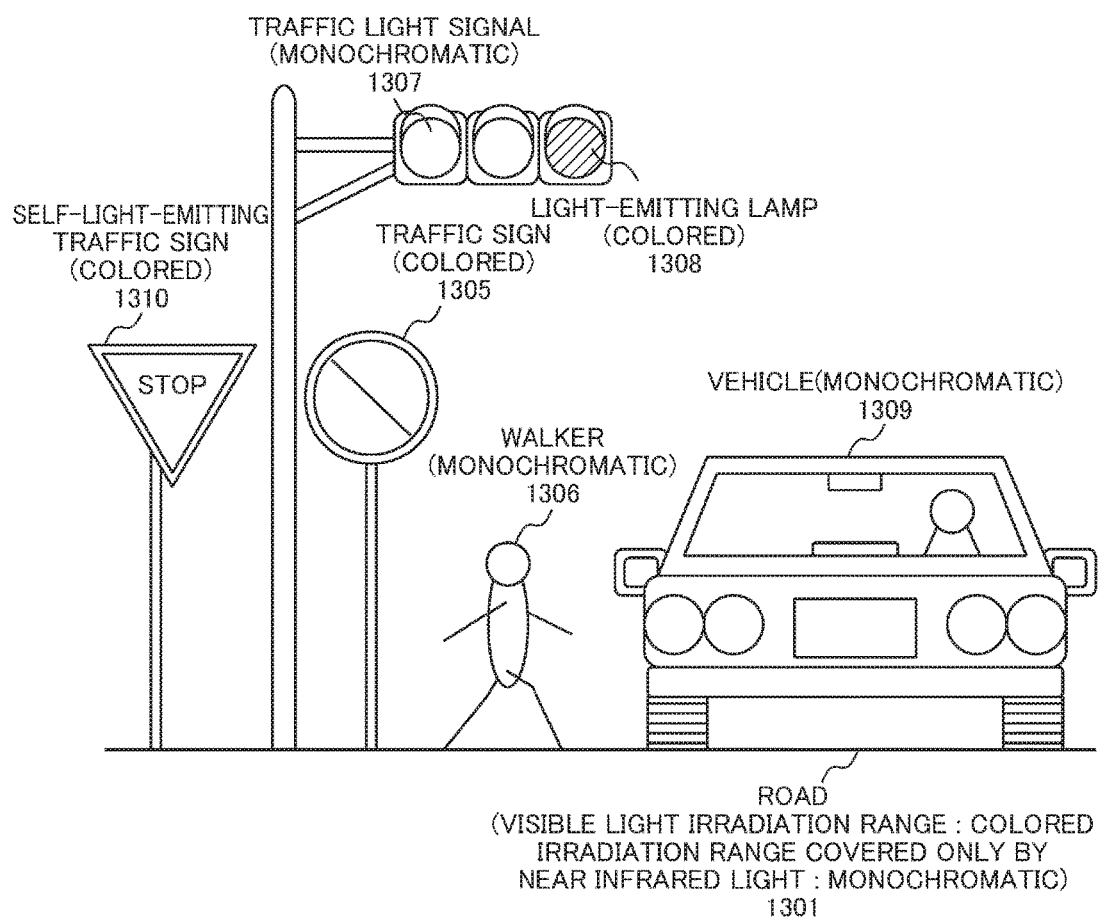
OUTPUT PICTURE OF IMAGING DEVICE ACCORDING TO FIFTH EMBODIMENT

OUTPUT PICTURE OF PICTURE SYNTHESIS DEVICE

OUTPUT PICTURE OF IMAGING DEVICE ACCORDING TO SIXTH EMBODIMENT

IMAGING DEVICE, IMAGING METHOD, AND ON-BOARD IMAGING SYSTEM

TECHNICAL FIELD

The present invention relates to an imaging device, an imaging method, and an on-board imaging system.

BACKGROUND ART

Patent Literature 1 below is exemplified herein as one of the background prior arts, in which it is disclosed that 'an imaging device comprising: an image capturing unit to capture an image of a target object so as to generate a picture; a color temperature data calculation unit to calculate color temperature data of the target object; a recording unit to record a plurality of color reproduction matrices for each of a natural light source and at least one kind of artificial light sources in correspondence with a type and a position coordinate within a prescribed color space of the light sources; an operation unit to select two of the color reproduction matrices which are corresponded to the position coordinate within the prescribed color space nearer to a position coordinate corresponding to the color temperature data and are corresponded to the same type of light sources and to select two or less color reproduction matrices corresponded to the light sources other than the same type of light sources from the color reproduction matrices recorded in the recording unit so as to operate corrected color reproduction matrices by performing interpolation processing on a plurality of the selected color reproduction matrices based on the position coordinates of the color reproduction matrices and the position coordinate corresponding to the color temperature data to calculate corrected color reproduction matrices; and a color reproduction processing unit to perform color reproduction processing on the picture generated by the image capturing unit employing the corrected color reproduction matrices'.

CITATION LIST

Patent Literature

Patent Literature 1: Japanese Patent Registration No. 4251317

SUMMARY OF INVENTION

Technical Problem

However, Patent Literature 1 discloses the sensitivity characteristics only of the visible light region, so that there is much to be desired for the color reproduction when a color picture is captured with an image capturing unit comprising pixels sensitive to the visible light and near infrared light regions and pixels sensitive to the near infrared light region.

The present invention provides an imaging device, an imaging method, and an on-board imaging system allowing an output picture excellent in color reproduction according to the types of light sources to be obtained even when a color picture is captured with an image capturing unit comprising pixels sensitive to the visible light and near infrared light regions and pixels sensitive to the near infrared light region.

Solution to Problem

The principal subject matters claimed in the present application are excerpted as follows.

(1) An imaging device comprising: an image sensor provided with pixels sensitive to visible light and near infrared light regions and pixels sensitive to the near infrared light region; a color reproduction processing unit that performs color reproduction processing with the use of a signal from the pixels sensitive to the visible light and near infrared light regions and a signal from the pixels sensitive to the near infrared light region among signals outputted from the image sensor; a visible light amount calculating unit that calculates a signal quantity of the visible light region with the use of the signals outputted from the image sensor; and a control unit that controls the color reproduction processing unit such that the color reproduction processing is carried out based on the signal quantity of the visible light region calculated by the visible light amount calculation unit.

(2) The imaging device according to the above (1) further comprising a near infrared light amount calculation unit that calculates a signal quantity of the near infrared light region with the use of the signals outputted from the image sensor, wherein the control unit controls the color reproduction processing unit such that the color reproduction processing is carried out according to a difference in the signal quantity between the visible light region and the near infrared light region.

(3) An imaging method employing an imaging device provided with an image sensor comprising pixels sensitive to visible light and near infrared light regions and pixels sensitive to the near infrared light region, the method comprising: a visible light amount calculating step of calculating a signal quantity of the visible light region with the use of signals outputted by the image sensor; and a color reproduction processing step with the use of a signal from the pixels sensitive to the visible light and near infrared light regions and a signal from the pixels sensitive to the near infrared light region based on the calculated signal quantity of the visible light region.

(4) An on-board imaging system comprising: an imaging device including an image sensor provided with pixels sensitive to visible light and near infrared light regions and pixels sensitive to the near infrared light region, a color reproduction processing unit that performs color reproduction processing with the use of a signal from the pixels sensitive to the visible light and near infrared light regions and a signal from the pixels sensitive to the near infrared light region among signals outputted from the image sensor, a visible light amount calculating unit that calculates a signal quantity of the visible light region with the use of the signals outputted by the image sensor, and a control unit that controls the color reproduction processing unit such that the color reproduction processing is carried out based on the signal quantity of the visible light region calculated by the visible light amount calculating unit; a visible light irradiation light source to irradiate visible light onto a target object; a near infrared light irradiation light source to irradiate near infrared light on the target object; a picture recognition device to recognize an object from a picture outputted from the imaging device; a picture synthesis device to output a synthesized picture resulting from the picture outputted by the imaging device synthesized with a recognition result of the picture recognition device; a display device to display the synthesized picture outputted by the picture synthesis device; and a system control device.

Advantageous Effects of Invention

The present invention provides an imaging device, an imaging method, and an on-board imaging system allowing an output image excellent in color reproduction according to the types of light sources to be obtained even when a color picture is captured employing an image capturing unit comprising pixels sensitive to visible light and near infrared light regions and pixels sensitive to the near infrared light region.

BRIEF DESCRIPTION OF DRAWINGS

FIG. 3 is a view showing one example of the wavelength to sensitivity property of the pixels of the image capturing device.

FIG. 11 is a view showing one exemplified arrangement of a modified imaging device.

FIG. 14 is a view showing one example of a picture outputted from a visible light region image capturing device.

FIG. 16 is a view showing one example of a picture outputted from an imaging device.

DESCRIPTION OF EMBODIMENTS

Hereafter, the preferred mode of carrying out the present invention is explained with reference to the accompanying drawings.

First Embodiment

Figure 1:
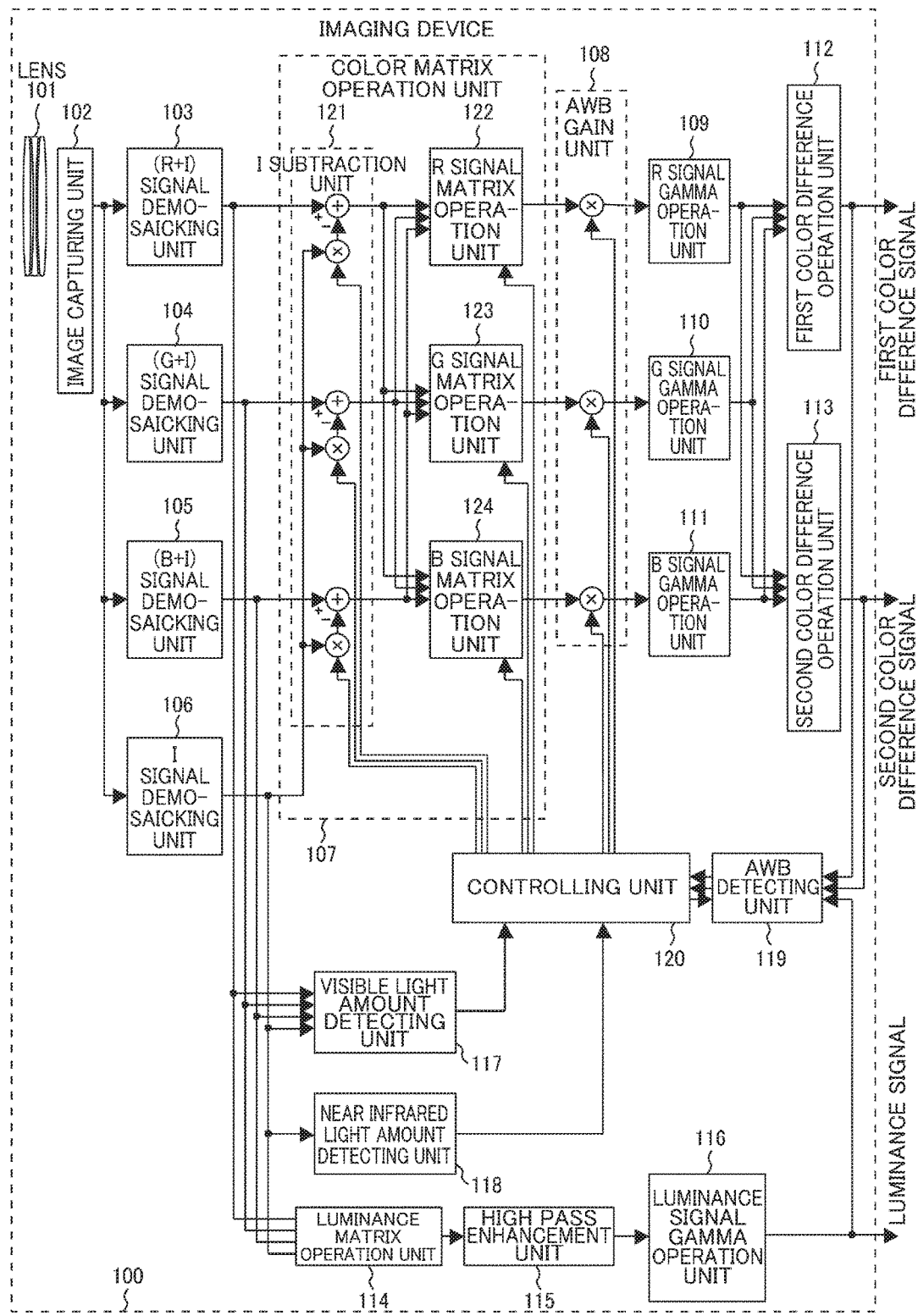
FIG. 1 is a view showing one exemplified arrangement of an imaging device.

FIG. 1 is a structural arrangement of an imaging device 100 according to the first embodiment.

The imaging device 100 comprises where appropriate: a lens 101; an image capturing unit 102; a (red region+near infrared light region, hereinafter, referred to as (R+I)) signal demosaicking unit 103; a (green region+near infrared light region, hereinafter, referred to as (G+I)) signal demosaicking region 104; a (blue region+near infrared light region, hereinafter, referred to as (B+I)) signal demosaicking region 105; a near infrared light region (hereinafter, referred to as I) signal demosaicking region 106; a color matrix operation unit 107; an auto white balance (hereinafter, referred to as AWB) gain unit 108; an R signal gamma operation unit 109; a G signal gamma operation unit 110; a B signal gamma operation unit 111; a first color difference operation unit 112; a second color difference operation unit 113; a luminance matrix operation unit 114; a high pass enhancement unit 115; a luminance signal gamma operation unit 116; a visible light amount detecting unit 117; near infrared light amount detection unit 118; an AWB detecting unit 119; and a controlling unit 120.

The lens 101 corresponds to a lens or a group of lenses that forms an image of light derived from a target object.

The image capturing unit 102 comprises where appropriate: (R+I) pixels, (G+I) pixels and (B+I) pixels which are sensitive to both the visible light region and the near infrared light region and I pixels sensitive to the near infrared light region. The respective pixels subject the light whose image is formed by the lens 101 to photoelectric conversion and A/D conversion, in which the signals being digital data and derived from the respective pixels are outputted.

The (R+I) signal demosaicking unit 103 subjects a signal derived from the (R+I) pixels and outputted from the image capturing unit 102 to interpolation processing and outputs an (R+I) signal corresponding to the positions of the other (G+I) pixels, (B+I) pixels and I pixels. Likewise, the (G+I) signal demosaicking unit 104 subjects a signal derived from the (G+I) pixels and outputted from the image capturing unit 102 to interpolation processing and outputs a (G+I) signal. Likewise, the (B+I) signal demosaicking unit 105 subjects a signal derived from the (B+I) pixels and outputted from the image capturing unit 102 to interpolation processing and outputs a (B+I) signal. Likewise, the I signal demosaicking unit 106 subjects a signal derived from I pixels and outputted from the image capturing unit 102 to interpolation processing and outputs an I signal.

The color matrix operation unit 107 operatively performs color reproduction processing with the use of the signals outputted from the (R+I) signal demosaicking unit 103, the (G+I) signal demosaicking unit 104, the (B+I) signal demosaicking unit 105 and the I signal demosaicking unit 106 respectively and the subtraction coefficient and the color matrix coefficient outputted from the controlling unit 120 so as to output an R signal, a G signal and a B signal which are color signals.

The AWB gain unit 108 multiplies the respective color signals outputted from the color matrix operation unit 107 by an AWB gain corresponding to the color temperature of the light source so as to output the respective color signals multiplied by the AWB gain.

The R signal gamma operation unit 109 performs a gamma operation on the R signal outputted from the AWB gain unit 108 so as to output the resulting R signal. Likewise, the G signal gamma operation unit 110 performs a gamma operation on the G signal outputted from the AWB gain unit 108 so as to output the resulting G signal. Likewise, the B signal gamma operation unit 111 performs a gamma operation on the B signal outputted from the AWB gain unit 108 so as to output the resulting B signal.

The first color difference operation unit 112 and the second color difference operation unit 113 generate a first color difference signal and a second color difference signal based on the color signals outputted from the R signal gamma operation unit 109, the G signal gamma operation unit 110 and the B signal gamma operation unit 111. For example, the color difference may be determined in accordance with the standard BT.709 set up by ITU-R (International Telecommunication Union-Radio communications Sector), in which the first color difference signal may be defined as Pb being a color difference signal indicating the difference principally between blue color and luminance while the second color difference signal may be defined as Pr being a color difference signal indicating the difference principally between red color and luminance. The first and second color difference signals are outputted to the exterior of the imaging device 100.

The luminance matrix operation unit 114 generates a luminance signal with the use of the signals outputted from the (R+I) signal demosaicking unit 103, the (G+I) signal demosaicking unit 104, the (B+I) signal demosaicking unit 105 and the I signal demosaicking unit 106 respectively.

The high pass enhancement unit 115 subjects the luminance signal outputted from the luminance matrix operation unit 114 to the processing in which higher spatial frequency components are enhanced so as to output the luminance signal in which the contouring outline of a picture (i.e. edges) is clearly imaged.

The luminance signal gamma operation unit 116 performs gamma correction processing on the luminance signal outputted from the high pass enhancement unit 115 so as to output the resulting luminance signal to the exterior of the imaging device 100. The luminance signal, the first and second color difference signals outputted to the exterior of the imaging device 100 are all picture signal outputs in color.

The visible light amount detecting unit 117 detects the amount of the irradiated light over the visible light region in the vicinity of target pixels from the signals outputted from the (R+I) signal demosaicking unit 103, the (G+I) signal demosaicking unit 104, the (B+I) signal demosaicking unit 106 and the I signal demosaicking unit 106 respectively so as to output the resulting amount of the irradiated light as a signal quantity over the visible light region.

The near infrared light amount detecting unit 118 detects the amount of the irradiated light over the near infrared light region in the vicinity of target pixels the signals outputted from the (R+I) signal demosaicking unit 103, the (G+I) signal demosaicking unit 104, the (B+I) signal demosaicking unit 106 and the I signal demosaicking unit 106 respectively so as to output the resulting amount of the irradiated light as a signal quantity over the near infrared light region.

The AWB detecting unit 119 detects the displacement of a white balance with the use of, where appropriate, the first and second color difference signals outputted from the first and second color difference operation units 112 and 113, the luminance signal outputted from the luminance signal gamma operation unit 116 and a signal outputted from the controlling unit 120 and indicating the range over which AWB is detected so as to output a white balance detection signal.

The controlling unit 120 determines a subtraction coefficient and a color matrix coefficient optimum for the light source in the vicinity of target pixels with the use of the signal quantity over the visible light region outputted from the visible light amount detecting unit 117 and the signal quantity over the near infrared light region outputted from the near infrared light region detecting section 118 so as to output those coefficients to the color matrix operation unit 107.

Further, the controlling unit 120 generates a signal indicating the range over which AWB is detected and that is optimum for the light source in the vicinity of target pixels with the use of the signal quantity over the visible light region outputted from the visible light amount detecting unit 117 and the signal quantity over the near infrared light region outputted from the near infrared light amount detecting unit 118 so as to output the generated signal to the AWB detecting unit 119.

Thus, with the imaging device to capture a color picture employing an image capturing device comprising pixels sensitive to the visible light region and the near infrared light region and pixels sensitive to the near infrared light region, performing the color matrix processing and subtraction processing with the influence of the near infrared light taken into account permits the color difference signal excellent in color reproduction to be obtained.

The color matrix operation unit 107, for example, comprises an I subtraction unit 121, an R signal matrix operation unit 122, a G signal matrix operation unit 123 and a B signal matrix operation unit 124 where appropriate.

The I subtraction unit 121 subtracts a value obtained by multiplying the I signal outputted from the I signal demosaicking unit 106 by a weighted coefficient (subtraction coefficient) from the (R+I) signal outputted from the (R+I) signal demosaicking unit 103 so as to generate the R signal. Further, the I subtraction unit 121 subtracts a value obtained by multiplying the I signal outputted from the I signal demosaicking unit 106 by the subtraction coefficient from the (G+I) signal outputted from the (G+I) signal demosaicking unit 104 so as to generate the G signal. Moreover, the I subtraction unit 121 subtracts a value obtained by multiplying the I signal outputted from the I signal demosaicking unit 106 by the subtraction coefficient from the (B+I) signal outputted from the (B+I) signal demosaicking unit 105 so as to generate the B signal. Such subtraction permits the signal components only of the visible light region with the exclusion of those of the near infrared light region to be obtained.

The R signal matrix operation unit 122 generates and outputs the R signal better at color reproduction through matrix operation from the R signal, G signal and B signal outputted from the I subtraction unit 121. Likewise, the G signal matrix operation unit 123 generates and outputs the G signal better at color reproduction through matrix operation from the R signal, G signal and B signal outputted from the I subtraction unit 121. Likewise, the B signal matrix operation unit 122 generates and outputs the B signal better at color reproduction through matrix operation from the R signal, G signal and B signal outputted from the I subtraction unit 121.

As mentioned above, according to the present embodiment, since the color matrix coefficient and the subtraction coefficient can be controlled according to the signal quantity of the visible light region and that of the near infrared light region, the imaging device 100 in which the color difference signal excellent in color reproduction can be obtained is provided even when a color picture is captured employing the image capturing unit comprising pixels sensitive to the visible light region and the near infrared light region and pixels sensitive to the near infrared light region.

Figure 2:
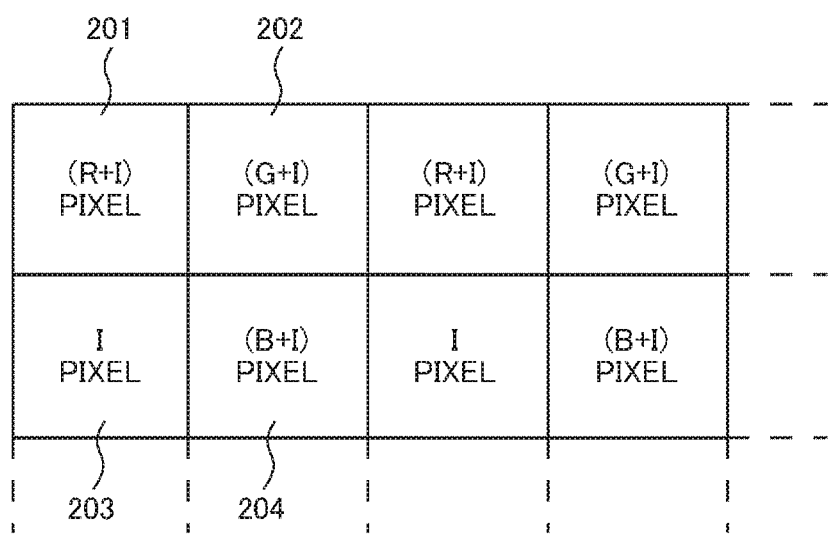
FIG. 2 is a view showing one example of the disposition of pixels of an image capturing unit.

Then, the image capturing unit 102 according to the present embodiment is explained as follows. FIG. 2 is a view showing the disposition of pixels of the image capturing element of the image capturing unit 102. It is shown in FIG. 2 that four colored pixels including the (R+I) pixel 201, the (G+I) pixel 202, the I pixel 203 and the (B+I) pixel 204 form the unitary arrangement of 2 by 2 pixel size, which unitary arrangements are vertically and horizontally repeated.

FIG. 3 is a view showing one example of the wavelength to sensitivity property of the respective pixels of the image capturing element illustrated in FIG. 2. In the image capturing unit 102, there are included four types of pixels, namely, the (R+I) pixel sensitive to the red region (R) 301 of the visible light region and the near infrared light region (I) 302; the (G+I) pixel sensitive to the green region (G) 305 of the visible light region and the near infrared light region (I) 306; the I pixel sensitive to the near infrared light region (I) 309; and the (B+I) pixel sensitive to the blue region (B) 311 of the visible light region and the near infrared light region (I) 312.

The purposes of using the image capturing element sensitive to the near infrared light region as illustrated in FIG. 3 lie in that the sensitivity to the near infrared light region in addition to that to the visible light region permits the minimum target object illumination to improve under the environment by the light sources such as the sunlight, halogen lamps in which light is irradiated by wavelengths of both the visible light region and the near infrared light region; and the reflection characteristics and the light emitting characteristics peculiar to the near infrared light region of a target object are detected, by way of some examples.

However, when color signals are determined from signals outputted from the image capturing unit 102, in light of the reproducibility of sensitivity to human eyes, the component of the near infrared light region (I) becomes an unrequired wavelength component. For instance, providing that the sensitivity to the near infrared light region (I) included in each pixel illustrated in FIG. 3 is substantially the same, subtracting the output signal of the I pixel from the output signals of the (R+I) pixel allows a signal sensitive to the red region (R) to be obtained. This subtraction is also applicable to the green region (G) and the blue region (B) with the same effect. In turn, even when the sensitivity to the near infrared light region (I) in each pixel varies, adjusting a coefficient used upon subtraction (i.e. subtraction coefficient described below) permits the component of the near infrared light region (I) to be reduced. However, as described below, there is inconsistency in sensitivity to the near infrared light region (I) among each pixel and an unrequired wavelength component is included in each pixel as commented below. As for the concrete method of mitigating the deterioration of the color reproduction caused by such inconsistency, it is described as follows centered on the operations of the color matrix operation unit 107 and the AWB gain unit 108.

Now, the operation of the color matrix operation unit 107 according to the present embodiment is explained as follows. At the color matrix operation unit, the R signal, the G signal and the B signal being the color signals are outputted based on the (R+I) signal, the (G+I) signal, the (B+I) signal and the (I) signal outputted from the image capturing unit 102.

First, at the I subtraction unit 121, the signal component of the near infrared light region is removed and the color signals R1, G1 and B1 sensitive to the visible light region are outputted.

$$R1=(R+I)-ki1 \times I \quad \text{(Formula 1)}$$

$$G1=(G+I)-ki2 \times I \quad \text{(Formula 2)}$$

$$B1=(B+I)-ki3 \times I \quad \text{(Formula 3)}$$

Herein, ki1, ki2 and ki3 denote subtraction coefficients.

Then, at the R signal matrix operation unit 122, the G signal matrix operation unit 123 and the B matrix operation unit 124, the R signal (R2), the G signal (G2) and the B signal (B2) which are color signals with enhanced color reproducibility are outputted.

$$R2=krr \times R1+krg \times G1+krb \times B1 \quad \text{(Formula 4)}$$

$$G2=kgr \times R1+kgg \times G1+kgb \times B1 \quad \text{(Formula 5)}$$

$$B2=kbr \times R1+kbg \times G1+kbb \times B1 \quad \text{(Formula 6)}$$

Herein, krr, krg, krb, kgr, kgg, kgb, kbr, kbg and kbb denote color matrix coefficients.

Provided that the wavelength to sensitivity properties of each pixel illustrated in FIG. 3 are overlapped one over another, there is a region in which the red component (R), the green component (G) and the blue component (B) are all sensitive to the same wavelength or the properties of the red component (R), the green component (G) and the blue component (B) are overlapped one over another. As a rule, the color reproducibility improves by adjusting the largeness of the region in which their properties are overlapped one over another through the color matrix operation expressed with the formulae 4 to 6 in accordance with the characteristics of the region in which their properties are overlapped one over another.

Further, the above formulae 1 to 3 and formulae 4 to 6 may be expressed as follows by modifying them.

$$R2=krr2 \times (R+I)+krg2 \times (G+I)+krb2 \times (B+I)+kii2 \times I \quad \text{(Formula 7)}$$

$$G2=kgr2 \times (R+I)+kgg2 \times (G+I)+kgb2 \times (B+I)+kgi2 \times I \quad \text{(Formula 8)}$$

$$B2=krr2 \times (R+I)+krg2 \times (G+I)+krb2 \times (B+I)+kii2 \times I \quad \text{(Formula 9)}$$

Herein, (krr2, krg2, krb2, kri2, kgr2, kgg2, kgb2, kgi2, kbr2, kbg2, kbb2 and kbi2) denote color matrix coefficients.

The formulae 1 to 3 correspond to the matrix operation of three rows by one column while the formulae 4 to 6 correspond to the matrix operation of three rows by four columns, but they can be expressed with the matrix operation of three rows by four columns as exemplified in the formulae 7 to 9. Therefore, it is shown in FIG. 1 that the color matrix operation unit 107 comprises the I subtraction unit 121; the R signal matrix operation unit 122; the G signal matrix operation unit 123 and the B signal matrix operation unit 124, but it can be arranged such that the formulae 7 to 9 are realized. In this case, the number of operational stages reduces, so that it mitigates the deterioration of the color reproducibility while improving on latency upon such modified color matrix operation unit realized on hardware.

Then, the operation of the AWB gain unit 108 according to the present embodiment is explained as follows. At the AWB gain unit 108, in accordance with the color temperature of the light source, the following calculations are executed.

$$R3=kr \times R2 \quad \text{(Formula 10)}$$

$$G3=kg \times G2 \quad \text{(Formula 11)}$$

$$B3=kb \times B2 \quad \text{(Formula 12)}$$

Herein, (kr, kg and kb) denote coefficients respectively called an AWB gain.

However, there is actually inconsistency in the wavelength to sensitivity property of each pixel over the near infrared light region (I) components (see reference signs 302, 306, 309 and 312 in FIG. 3), so that the near infrared light region (I) components cannot be optimally mitigated just with the signal value of the I pixel subtracted.

Further, there are included unrequired components in each pixel. For example, in the case of the (R+I) pixel, the red region (R) 301 and the near infrared light region (I) 302 illustrated in FIG. 3 correspond to effective wavelength components whereas what are denoted with reference signs 303 and 304 in FIG. 3 correspond to unrequired wavelength components. This is also applied to the other pixels, in which there are unrequired wavelength components 307 and 308 in the (G+I) pixel, an unrequired wavelength component 310 in the (I) pixel and an unrequired wavelength component 313 in the (B+I) pixel. It is desirable that such unrequired wavelength components (reference signs 303, 304, 307, 308, 310 and 313 in FIG. 3) be zero, but it is hard to achieve, so that it results that in terms of the wavelength to sensitivity property of each pixel upon the signal value of the I pixel being subtracted or subsequent to the color matrix operation unintended wavelength components entail plus or minus sensitivity.

The influences brought by such inconsistency in the wavelength to sensitivity property of each pixel over the near infrared light region (I) components and unrequired wavelength components differ according to the types of light sources.

For instance, in the case of a commercially available three-wavelength fluorescent lamp being adopted for the light source, it has one radiant energy peak at the respective red region (R), the green region (G) and the blue region (B) over the visible light region and the wavelengths of the other regions including the near infrared light region (I) have little radiation or no radiation. In this case, there is no influence brought by such inconsistency in the wavelength to sensitivity property of each pixel over the near infrared light region (I) components, but it is prone to be influenced by unrequired wavelength components. Further, for instance, in the case of a halogen lamp being adopted for the light source, it has higher radiant energy over the near infrared light region than over the visible light region. In this case, there is substantial influence brought by such inconsistency in the wavelength to sensitivity property of each pixel over the near infrared light region (I) components whereas the influence brought by unrequired wavelength components becomes comparatively smaller. Moreover, for example, in the case of a near infrared light projector radiating over only the near infrared light region (I) adopted for the light source, the colors cannot be reproduced.

At the color matrix operation unit 107, it is aimed to realize improved color reproduction by minimizing such influences and adjusting the manner in which the properties of the respective wavelength components are overlapped one over another, but due considerations shall be taken that, according to the difference in radiant energy between the visible light region and the near infrared light region covered by the light source, the degree to which such unrequired wavelength components and inconsistency influence the color reproducibility differs. However, in the case of the matrix coefficients being fixed or the color matrix being controlled on the color space as disclosed in Patent Literature 1, the problem lies in that the difference in radiant energy between the visible light region and the near infrared light region is not taken into account, so that improved color reproduction is unattainable. Thus, in order to solve such problem, in the present embodiment, the means by which the subtraction coefficient or the color matrix coefficient is selected according to the difference in radiant energy between the visible light region and the near infrared light region covered by the light source is introduced. Such means and the advantageous effects brought by the same are explained as follows.

In the present embodiment, in order to detect the difference in radiant energy between the visible light region and the near infrared light region covered by the light source, the visible light amount detecting unit 117, the near infrared light amount detecting unit 118 and the controlling unit 120 illustrated in FIG. 1 are employed.

The visible light amount detecting unit 117 detects the signal quantity Yd of the visible light region in the vicinity of a target pixel through the following calculation, for example.

$$Yd=\Sigma(kyd1\times((R+I)-kid1\times I)+kyd2\times((G+I)-kid2\times I)+kyd3\times((B+I)-kid3\times I)) \quad \text{(Formula 13)}$$

Herein, (kid1, kid2, kid3, kyd1, kyd2 and kyd3) denote coefficients whiles $\Sigma$ denotes the total sum of the signal quantity in the vicinity of a target pixel.

The near infrared light amount detecting unit 118 detects a signal quantity Id of the near infrared light region in the vicinity of a target pixel through the following calculation, for example.

$$Id=\Sigma I \quad \text{(Formula 14)}$$

Herein, $\Sigma$ denotes the total sum of the signal quantity in the vicinity of a target pixel. The region covered by the total sum is the same as defined in the case of Formula 5.

The operations of Formulae 13 and 14 are carried out per pixel or per frame or field of a video image.

According to the results of Formulae 13 and 14, the controlling unit 120 illustrated in FIG. 1 compares the radiant energy of the visible light region with that of the near infrared light region.

Figure 4:
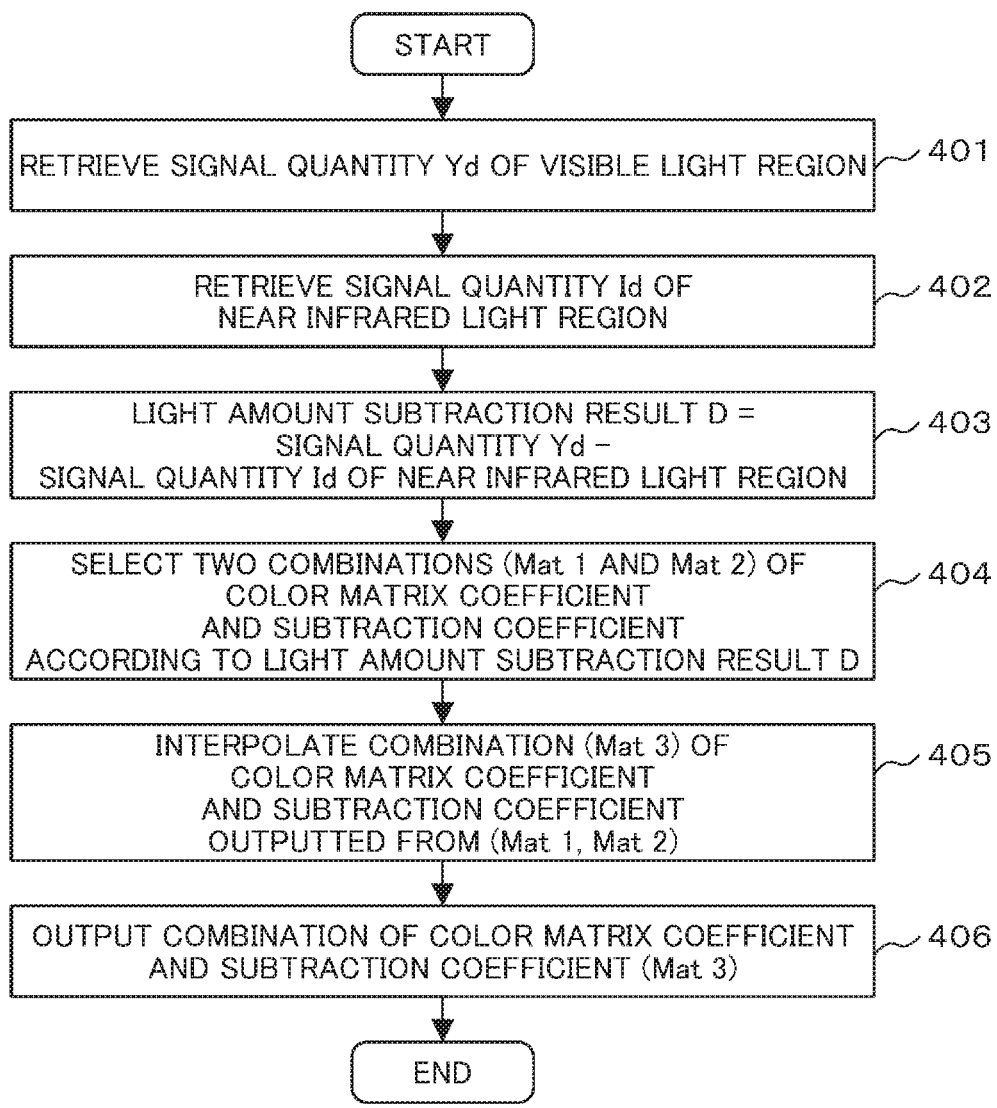
FIG. 4 is a view showing one example of a flow chart on how to decide a color matrix coefficient and a subtraction coefficient at a controlling unit according to the first embodiment.

FIG. 4 shows one example of a flow chart on how to decide a color matrix coefficient and a subtraction coefficient at the controlling unit 120.

First, at Steps 401 and 402, the controlling unit 120 retrieves the signal quantity Yd of the visible light region from the visible light amount detecting unit 117 while retrieving the signal quantity Id of the near infrared light region from the near infrared light amount detecting unit 118. Here, it does not matter whether retrieving the signal quantity Yd of the visible light region precedes retrieving the signal quantity Id of the near infrared light region or they may be retrieved at the same time.

Then, at Step 403, the controlling unit 120 derives a light amount subtraction result D as follows.

$$D=Yd-Id \quad \text{(Formula 15)}$$

Subsequently, at Steps 404 and 405, the controlling unit 120 determines the combination of a subtraction coefficient and a color matrix coefficient or Mat 3 based on the light amount subtraction result D (hereinafter, it is defined that Mat* (in which * denotes an arbitrary number) denotes the combination of a subtraction coefficient and a color matrix coefficient). As known from Formula 15, D becomes comparatively higher under the light source in which the radiant energy of the visible light region is higher such as under a fluorescent lamp; D becomes comparatively lower or minus under the light source in which radian energy of the near infrared light region is higher such as under a halogen lamp; and D tends to be minus with a larger absolute value under the light source in which the radiant energy of the near infrared light region only is strong such as under a near infrared light projector. The controlling unit 120 is capable of estimating the types of the light sources based on the tendency of such light amount subtraction result D and generating the appropriate combination of a color matrix coefficient and a subtraction coefficient or Mat 3 according to the types of the light sources.

At Step 406, the controlling unit 120 outputs the combination of a color matrix coefficient and a subtraction coefficient or Mat 3 to the color matrix operation unit 107.

Figure 5:
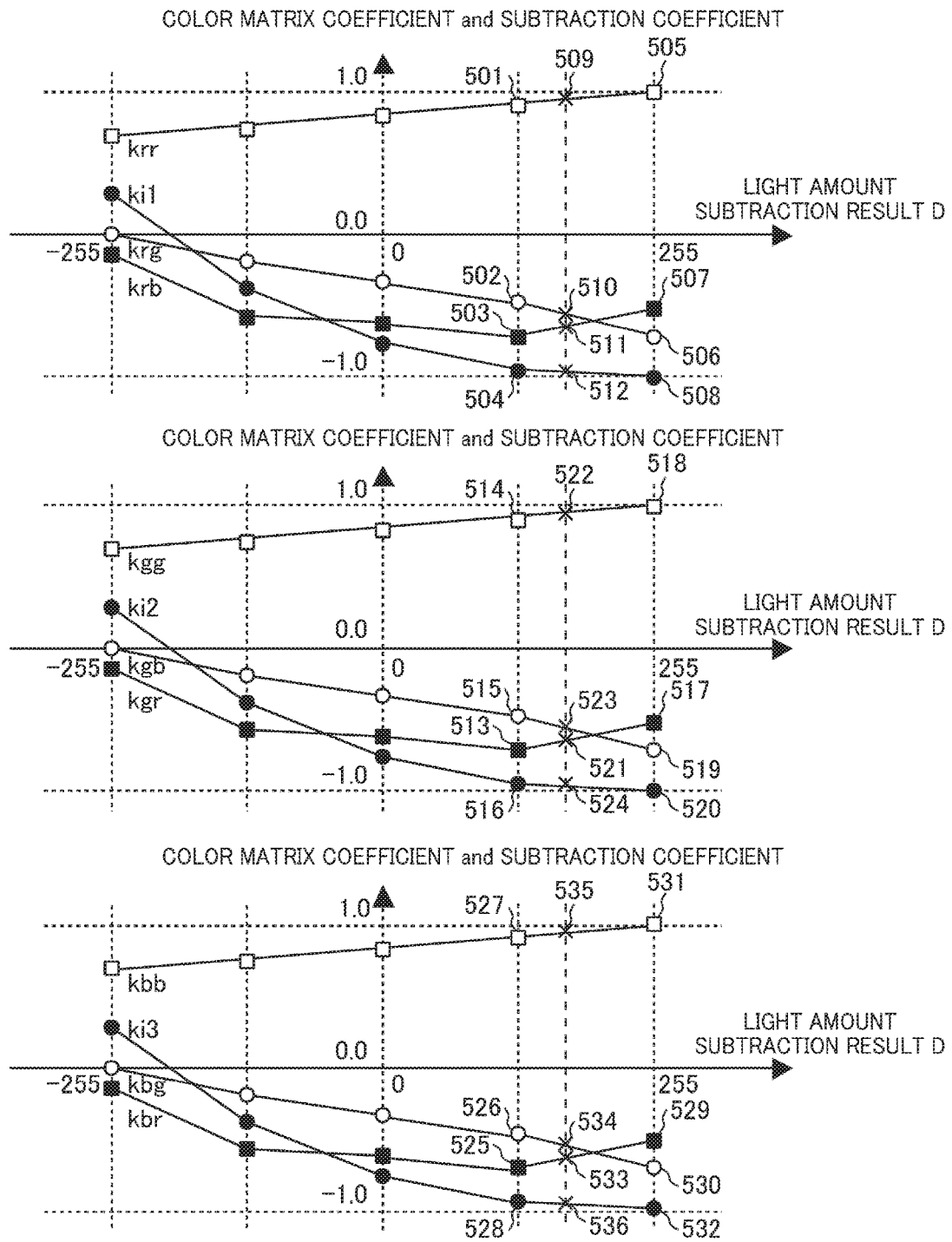
FIG. 5 is a view showing one example of how to interpolate a color matrix coefficient and a subtraction coefficient at the controlling unit according to the first embodiment.

Steps 404 and 405 are further explained in details with reference to FIG. 5.

FIG. 5 is a view showing the method of deriving a color matrix coefficient (krr, krg, krb, kgr, kgg, kgb, kbr, kbg, kbb) and a subtraction coefficient (ki1, ki2, ki3) from the light amount subtraction result D. A color matrix coefficient and a subtraction coefficient are predetermined for the non-consecutive values of the light amount subtraction result D. For example, according to the illustration of FIG. 5, they are predetermined for the values of D: −255, −128, 0, 128, 255. In the present embodiment, it is supposed that the values of Yd−Id can take those ranging from 0 to 255 and the values at both ends and those at three points between the ends are equi-distantly predetermined. Upon the light amount subtraction result D of a target pixel being determined, two combinations of the coefficients approximating to the value of such D are selected. The first selected combination is referred to as Mat 1 (501~504, 513~516, 525~528) while the second selected combination is referred to as Mat 2 (505~508, 517~520, 529~532). Starting from the foregoing, the combination of the coefficients determined through interpolation per coefficient based on those two combinations of the coefficients according to the value of D is referred to as Mat 3 (509~512, 521~524, 533~536).

For instance, as the combinations of the predetermined coefficients, it is arranged that when the light amount subtraction result D illustrated in FIG. 5 is −255, the combination of the coefficients is set such that it is optimum for a near infrared light projector, for example, or such that the color matrix coefficient is approximated to 0 so as to arise colorlessness; when D is 0, the combination of the coefficients is set such that it is optimum for a halogen lamp, for example, or through adjustment being made with taken into account both unrequired wavelength components and inconsistency in the wavelength to sensitivity property of each pixel over the near infrared light region components; when D is 255, a subtraction coefficient and a color matrix coefficient optimum for a fluorescent lamp (exclusively for the purpose of removing unrequired wavelength components within the visible light region) are set; and as for the values of D between −255 and 0 as well as between 0 and 255, the median values are adopted for the coefficients. This brings an advantageous effect that even in the case where the light source changes per region within the screen or time-sequentially optimum subtraction coefficient, a color matrix coefficient is selectable, which leads to improved color reproducibility.

Further, with reference to Formula 15, to the same effect, it may be arranged such that the ratio of Yd to Id is determined by division, but characteristically speaking, subtraction further minimizes the circuit scale.

Then, the AWB control according to the present embodiment is explained as follows.

Figure 6:
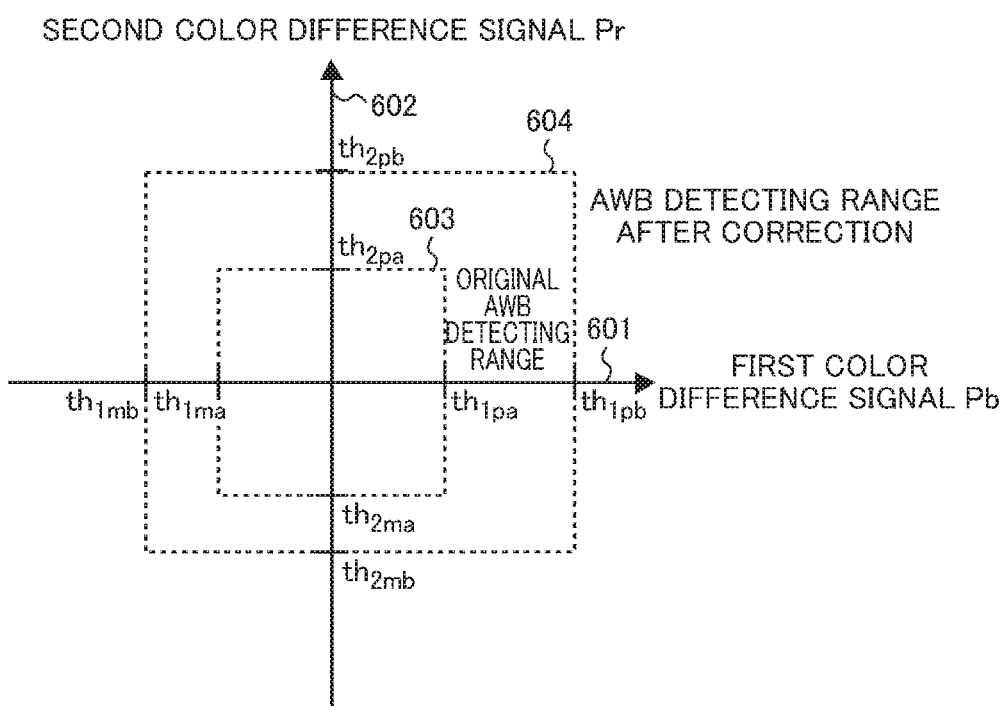
FIG. 6 is a view showing one example on how to decide an AWB gain at the controlling unit.

FIG. 6 is an explanatory view showing how to control an AWB detecting range at the controlling unit 120, in which the first color difference signal outputted from the first color difference operation unit 112 shown in FIG. 1 is scaled in the horizontal axis 601 of FIG. 6 while the second color difference signal outputted from the second color difference operation unit 113 is scaled in the vertical axis 602 thereof.

On the color difference plane, AWB detecting ranges 603 and 604 are defined. The AWB detecting ranges denote those of the color difference level of a pixel regarded as being white in terms of AWB. For instance, according to the illustration of FIG. 6, the AWB detecting ranges 603 and 604 are rectangularly defined with a threshold value set for each axis, but they may be defined with any shape besides exemplified herein.

The AWB detecting unit 119 determines an average value Pba of the first color difference signal (referred to as Pb herein) and an average value Pba of the second color difference signal (referred to as Pr herein) of all the pixels in which both of the first color difference signal Pb and the second color difference signal Pr of each pixel are within the AWB detecting range 604 so as to output those average values (Pba, Pra) to the controlling unit 120.

Colorlessness is defined as (Pb, Pr) being equal to (0,0), in which the controlling unit 120 adjusts the AWB gain (kr, kg, kb incorporated in Formulae 10 to 12 as mentioned earlier) such that the average values (Pba, Pra) are approximated to (0,0). For instance, it reduces the value of kb when Pba is higher whereas when the same is lower, it increases the value of Kb. Further, it reduces the value of kr when the average value Pra is higher whereas when the same is lower, it increases the value of Kr. The controlling unit 102 records the adjusted AWB gain within itself as well as outputs the same to the AWB gain unit 108.

The AWB detecting range in which a certain color matrix coefficient and a certain subtraction coefficient are defined is shown with reference sign 603 in FIG. 6. It is already shown through the flow chart illustrated in FIG. 4 that how to decide the subtraction and color matrix coefficients is controlled by the controlling unit. As a result, according to the change of the subtraction and color matrix coefficients, the first and second color difference signals change. In other words, the AWB detecting ranges also change.

When the AWB detecting range is too wide, there are cases where the portions within the screen other than being colorless are detected also as being colorless while when the same is too narrow, the white balance is not corrected in an appropriate manner. Thus, it is required that an optimum detecting range be selected. For that purpose, it is supposed herein that the AWB detecting range is also corrected according to the change of the subtraction and color matrix coefficients. When there occur changes in the subtraction and color matrix coefficients starting from the original AWB detecting range 603, the axes of the first and second color difference signals change based on Formulae 1 to 12 as well as the color difference calculation formula of the standard BT.709, by way of some examples. According to the change of the first and second color difference signals, the range in which the AWB detecting range is corrected is predetermined as well. In the present embodiment, the AWB detecting range 604 is decided based on the value of the light amount subtraction result D of Formula 15, the values of kr, kg and kb as well as the value of the luminance signal.

The imaging device according to the present embodiment brings an advantageous effect that optimum subtraction and color matrix coefficients are selectable even when the balance between the visible light and the non-visible light changes through the controlling of the AWB detecting range, which leads to improved color reproducibility.

Second Embodiment

Then, the second embodiment is explained as follows. The imaging device according to the second embodiment is arranged in the same way as that of the first embodiment, in which the processing details at the controlling section 120 are different from those of the first embodiment. Hereafter, as for the details similar to those of the first embodiment, they are omitted with reference being made to the corresponding descriptions of the first embodiment and the details different from the first embodiment are mainly explained.

Figure 7:
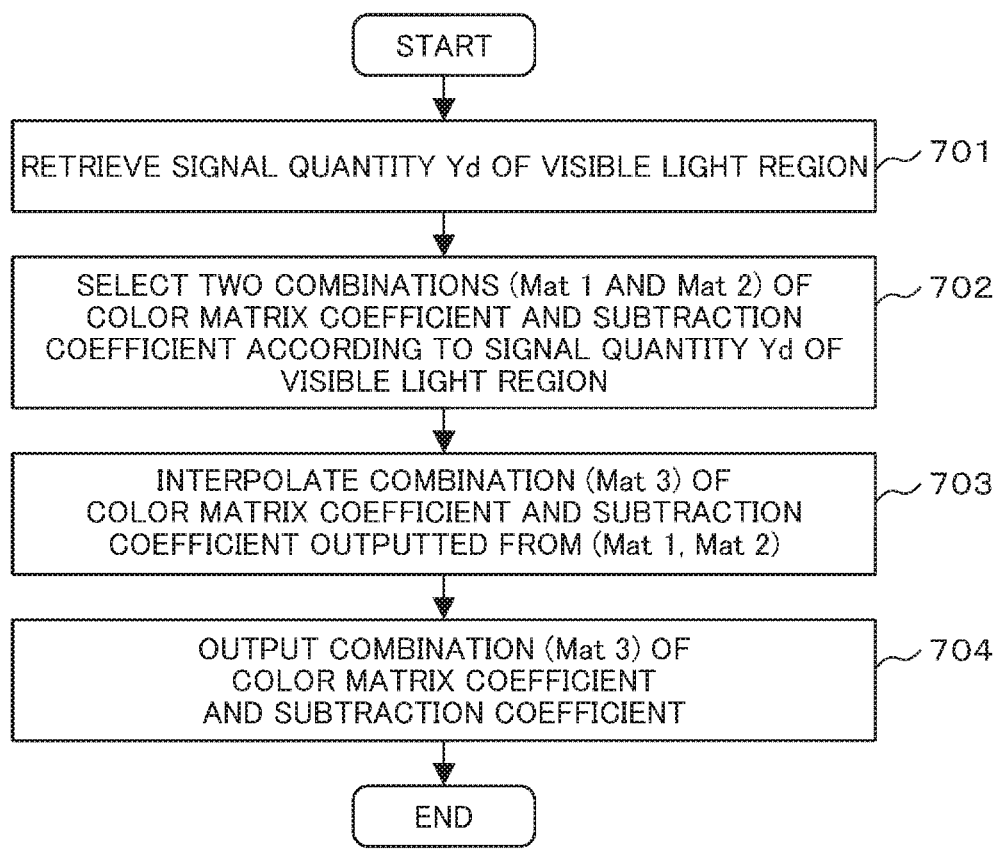
FIG. 7 is a view sowing one example of a flow chart on how to decide a color matrix coefficient and a subtraction coefficient at the controlling unit according to the second embodiment.

FIG. 7 shows one example of the flow chart showing the processing details of the controlling unit 120 or on how to decide a color matrix coefficient and a subtraction coefficient and the second embodiment.

First, at Step 701, the controlling unit 102 retries the signal quantity Yd of the visible light region from the visible light amount detecting unit 117.

Then, at Steps 702 and 703, the controlling unit 120 decides the combination of a subtraction and color matrix coefficients or Mat 3 from the signal quantity Yd of the visible light region. For example, Yd becomes higher under the light source whose radiant energy over the visible light region is higher such as under a fluorescent lamp or a halogen lamp and when the reflectivity of a target object is higher; and Yd tends to be comparatively lower when the light from the light source is hardly hit on such object or under the light source whose radiant energy over the near infrared light region is higher. The controlling unit 120 is capable of estimating the types of the light sources based on the tendency of the signal quantity Yd of the visible light region and generating the combination of appropriate color matrix and subtraction coefficients or Mat 3 according to the type of the light sources.

At Step 704, the controlling unit 120 outputs the generated combination of such appropriate color matrix and subtraction coefficients or Mat 3 to the color matrix operation unit 107.

Steps 702 and 703 are further in details explained with reference to FIG. 8.

Figure 8:
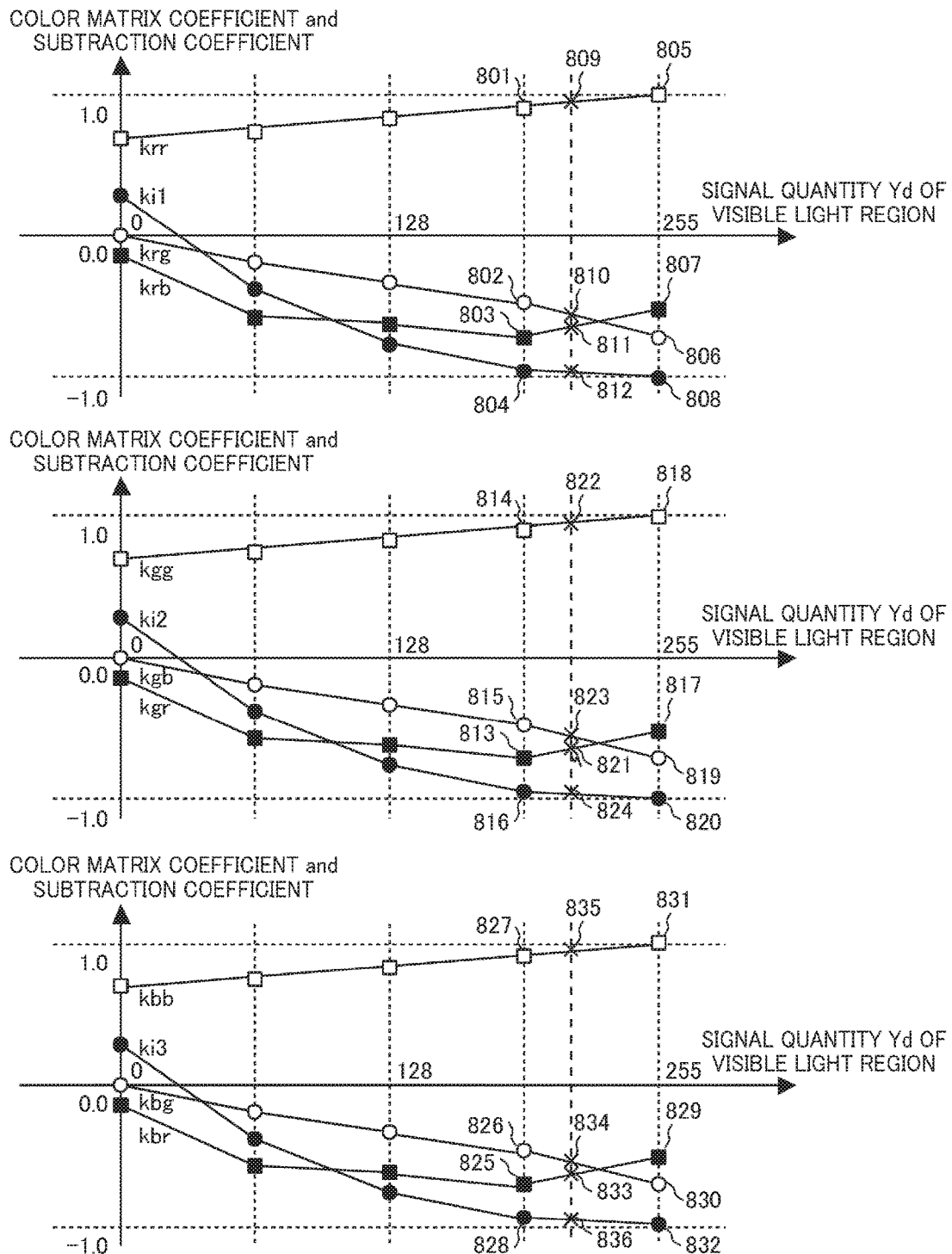
FIG. 8 is a view showing one example of how to interpolate a color matrix coefficient and a subtraction coefficient at the controlling unit according to the second embodiment.

FIG. 8 is a view showing how to derive color matrix coefficients (krr, krg, krb, kgr, kgg, kgb, kbr, kbg, kbb) and subtraction coefficients (ki1, ki2, ki3) from the signal quantity of the visible light region. A color matrix coefficient and a subtraction coefficient are predetermined for non-consecutive values of the signal quantity Yd of the visible light region. For instance, according to the illustration of FIG. 8, they are predetermined for the values 0, 64, 128, 192 and 255 of Yd. In the present embodiment, it is supposed that the values of Yd can take those ranging from 0 to 255 and the values at both ends and those at three points between the ends are equi-distantly predetermined. Once the signal quantity Yd of the visible light region of a target pixel is retrieved, two combinations of coefficients approximate to the value of such Yd are selected. The first selected combination is referred to as Mat 1 (801~804, 813~816, 825~828) and the second selected combination of coefficients is referred to as Mat 2 (805~808, 817~820, 829~832). Starting from the foregoing, the combination of coefficients determined through interpolation per coefficient based on those two combinations of coefficients according to the value of Yd is referred to as Mat 3 (809~812, 821~824, 833~836).

For instance, as the combinations of the predetermined coefficients, it is arranged that when the light amount subtraction result Yd illustrated in FIG. 8 is 0, a subtraction coefficient and a color matrix coefficient optimum for a near infrared light projector (e.g. making it colorless by the color matrix coefficient being approximated to 0) are set; when the Yd is 255, a subtraction coefficient and a color matrix coefficient optimum for a fluorescent lamp (exclusively for the purpose of removing unrequired wavelength components within the visible light region) are set; and as for the values of Yd between 0 and 255, the median values are adopted for the coefficients. This brings an advantageous effect that in the case where the light source changes per region within the screen or time-sequentially optimum subtraction coefficient, a color matrix coefficient is selectable, which leads to improved color reproducibility.

Further, in the second embodiment, unlike the first embodiment, the signal quantity of the near infrared light region is not employed. Thus, the imaging device according the present embodiment can be arranged with the exclusion of the near infrared light detecting unit 118 from FIG. 1. In this case, characteristically speaking, the circuit scale can be minimized.

Third Embodiment

Subsequently, the third embodiment is explained as follows. The imaging device according to the third embodiment is arranged in the same way as the first embodiment.

Subsequently, the third embodiment is explained as follows. The imaging device according to the third embodiment is arranged in the same way as the first embodiment. However, the processing details and as such at the controlling unit 120 are different from those of the first embodiment. Hereafter, as for the details similar to those of the first embodiment, they are omitted with reference being made to the corresponding descriptions of the first embodiment and the details different from the first embodiment are mainly explained.

Figure 9:
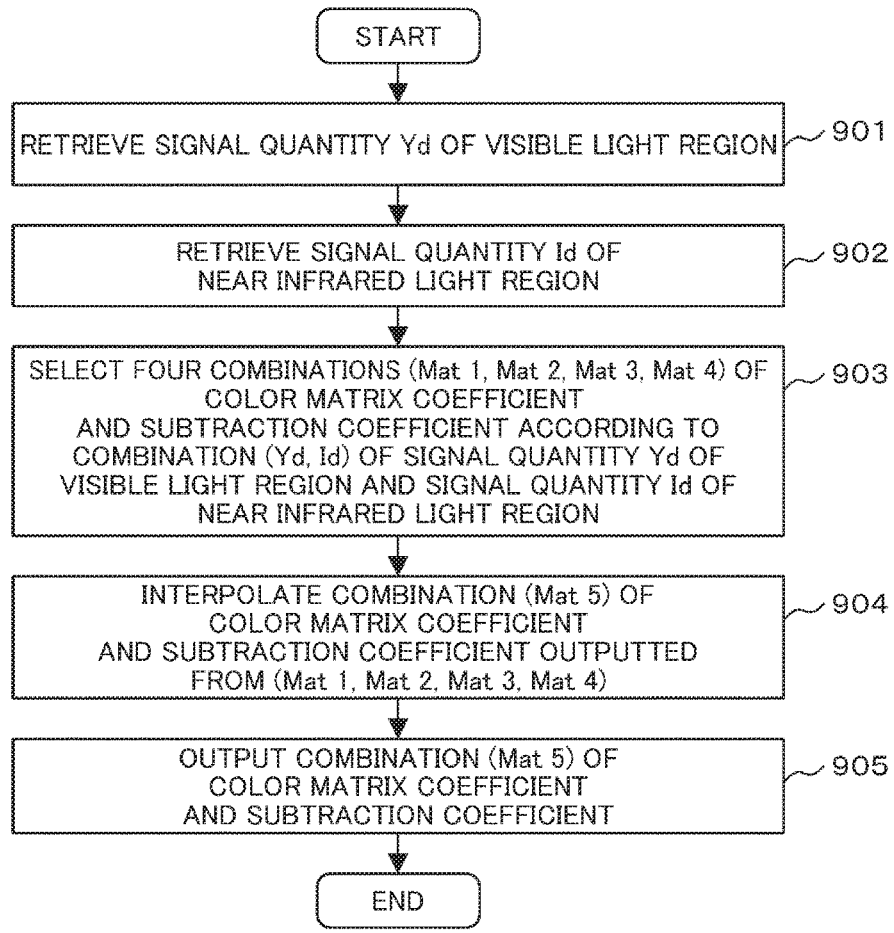
FIG. 9 is a view showing one example of a flow chart on how to decide a color matrix coefficient at the controlling unit.

FIG. 9 shows one example of the flow chart illustrating the processing details at the controlling unit 120 or on how to decide a color matrix coefficient and a subtraction coefficient.

First, at Steps 901 and 902, the controlling unit 120 retrieves the signal quantity Yd of the visible light region from the visible light amount detecting unit 117 while retrieving the signal quantity Id of the near infrared light region from the near infrared light amount detecting unit 118. Here, it does not matter whether retrieving the signal quantity Yd of the visible light region precedes retrieving the signal quantity Id of the near infrared light region or they may be retrieved at the same time.

Then, at Steps 903 and 904, the controlling unit 120 decides the combination Mat 5 of a subtraction coefficient and a color matrix coefficient based on the combinations of the signal quantity Yd of the visible light region and the signal quantity Id of the near infrared light region. Since there is a radiant energy characteristic per wavelength according to the types of the light sources, the combination of Yd and Id permits the types of the light sources whose light is mainly irradiated in the vicinity of a target pixel to be estimated. For instance, it can be estimated that when both of Yd and Id are higher, the light source is a halogen lamp; when Yd is higher while Id is lower, the light source is a fluorescent lamp; when Yd is lower while Id is higher, the light source is a near infrared light projector and so on. The combination Mat 5 of a color matrix coefficient and a subtraction coefficient appropriate for the estimated type of the light sources is generated.

At Step 905, the controlling unit 120 outputs the generated combination of coefficients or Mat 5 to the color matrix operation unit 107.

Steps 903 and 904 are further in details explained as follows with reference to FIG. 10.

Figure 10:
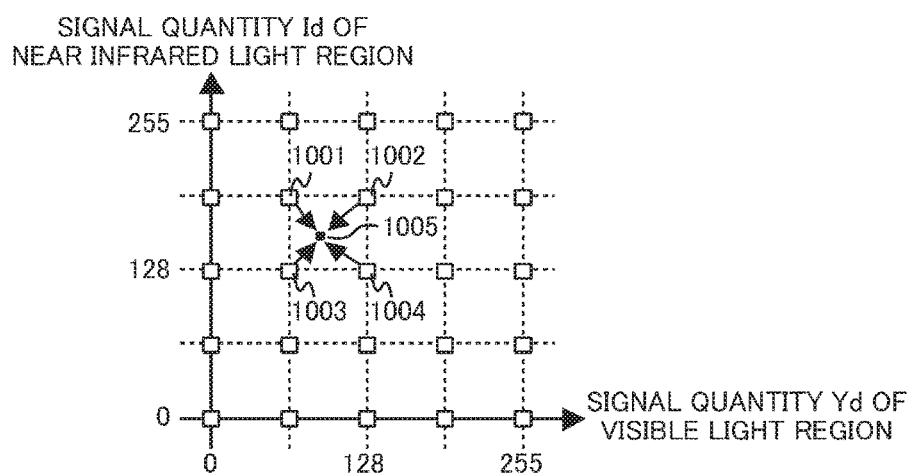
FIG. 10 is a view showing one example of how to interpolate a color matrix coefficient at the controlling unit.

FIG. 10 is a view showing how to derive a color matrix coefficient and a subtraction coefficient from the signal quantity Yd of the visible light region and the signal quantity Id of the near infrared light region. A color matrix coefficient and a subtraction coefficient are predetermined for the combination of the non-consecutive values of Yd and Id. For example, according to the illustration of FIG. 10, the combination of a color matrix coefficient and a subtraction coefficient is decided for the values of Yd and Id respectively or 0, 64, 128, 192, 255. In the present embodiment, it is supposed that the values of Yd and Id respectively can take those ranging from 0 to 255 and the values at both ends and those at three points between the ends are substantially equi-distantly predetermined. For instance, the respective coefficients are defined in the table for the combination of non-consecutive values of (Yd, Id).

Once the combination (Yd, Id) in the vicinity of a target pixel is decided, four combinations of coefficients approximate to (Yd, Id) are selected. The first selected combination of coefficients is referred to as Mat 1•1001; the second selected combination of coefficients is referred to as Mat 2•1002; the third selected combination of coefficients is referred to as Mat 3•1003; and the fourth selected combination of coefficients is referred to as Mat 4•1004. Starting from the foregoing, the combination of coefficients determined through interpolation per coefficient based on those four combinations of coefficients according to the values of (Yd, Id) is referred to as Mat 5•1005.

For instance, as the combinations of the predetermined coefficients, it is arranged that when the (Yd, Id) illustrated in FIG. 10 is (0, 0) and (0, 255), a subtraction coefficient and a color matrix coefficient optimum for a near infrared light projector (e.g. making it colorless by the color matrix coefficient being approximated to 0) are set; when the same is (255, 255), a subtraction coefficient and a color matrix coefficient optimum for a halogen lamp (adjustment being made with taken into account both of unrequired wavelength components and inconsistency in the wavelength to sensitivity property of each pixel over the near infrared light region components) are set; when the same is (255, 0), a subtraction coefficient and a color matrix coefficient optimum for a fluorescent lamp (exclusively for the purpose of removing unrequired wavelength components within the visible light region) are set; and as for the other combination values, the median values are adopted for them. This brings an advantageous effect that even in the case where the light source changes per region within the screen or time-sequentially optimum subtraction coefficient, a color matrix coefficient are selectable, which leads to improved color reproducibility. To note, in the present embodiment, one combination of coefficients is determined through interpolation per coefficient based on the four selected combinations of coefficients, but the number of combinations as initially selected is not limited to four but may be modified where appropriate.

Further, according to the third embodiment, since the light sources are estimated according to the absolute quantities of the respective values of the signal quantity of the near infrared light region and that of the visible light region, a color matrix coefficient and a subtraction coefficient appropriate for the light sources can be set with high precision, so that characteristically speaking it allows color reproducibility to be enhanced.

Fourth Embodiment

Then, the fourth embodiment is explained as follows. FIG. 11 shows the exemplified arrangement of the imaging device 1100 according to the fourth embodiment.

The imaging device 1100 comprises: a lens 101; an image capturing unit 102; an (R+I) signal demosaicking unit 103; a (G+I) signal demosaicking unit 104; a (B+I) signal demosaicking unit 105; an I signal demosaicking unit 106; a color matrix operation unit 1101; an AWB gain unit 108; an R signal gamma operation unit 109; a G signal gamma operation unit 110; a B signal gamma operation unit 111; a first color difference operation unit 112; a second color difference operation unit 113; a luminance matrix operation unit 114; a high pass enhancement unit 115; a luminance signal gamma operation unit 116; a visible light amount detecting unit 1102; a near infrared light amount detecting unit 118; an AWB detecting unit 119; and a controlling unit 120 where appropriate. Further, the color matrix operation unit 1101 comprises: an I subtraction unit 121; an R signal matrix operation unit 122; a G signal matrix operation unit 123; and a B signal matrix operation unit 124 where appropriate, for example.

Here, the structural arrangement of the imaging device 1100 illustrated in FIG. 11 according to the fourth embodiment, when compared with that according to the first embodiment, is the same as that of the first embodiment excepting the arrangement of the color matrix operation unit 1101 and the visible light amount detecting unit 1102, so that as for the arrangements similar to those of the first embodiment, they are omitted with reference being made to the corresponding descriptions of the first embodiment and those different from the first embodiment are mainly explained.

The color matrix operation unit 1101 illustrated in FIG. 11 basically has the same arrangement as the color matrix operation unit 107 illustrated in FIG. 1, in which the arrangement in which the output being an intermediate output of the I subtraction unit 121 illustrated in FIG. 11 is outputted to the visible light amount detecting unit 1102 is added to the former.

The visible light amount detecting unit 1102 illustrated in FIG. 11 is different from the visible light amount detecting unit 117 illustrated in FIG. 1 in that the color signals R1, G1 and B1 outputted from the I subtraction unit 121 are inputted to the former.

To begin with, in the same way as the first embodiment, with the signal components over the near infrared light region removed, the color signals R1, G1 and B1 sensitive to the visible light region are calculated as expressed with the aforesaid formulae 1 to 3 at the I subtraction unit 121.

The visible light amount detecting unit 1102 illustrated in FIG. 11 according to the fourth embodiment detects the signal quantity Yd of the visible light region in the vicinity of a target pixel through the following calculation.

$$Yd = \Sigma(kyd1 \times R1 + kyd2 \times G1 + kyd3 \times B1) \quad \text{(Formula 16)}$$

Herein, (kyd1, kyd2 kyd3) denote coefficients while denotes the total sum of the signal quantity in the vicinity of a target pixel.

This formula 16 is equal to what the following conditions are added to the formula 13 explained in the first embodiment.

$$kid1 = kd1 \quad \text{(Formula 17)}$$

$$kid2 = kd2 \quad \text{(Formula 18)}$$

$$kid3 = kd3 \quad \text{(Formula 19)}$$

Adding the conditions of these formulae 17 to 19 to the formula 13 allows the subsequent operation of the controlling unit 120 after the signal quantity Yd of the visible light region is calculated based on the color signals R1, G1 and B1 outputted from the I subtraction unit 121 to be carried out in the same way as the first embodiment illustrated in FIG. 1.

The operation of the controlling unit 120 may follow any corresponding operation exemplified in the first to third embodiments and adopt any modification presented in each of those embodiments where appropriate. Each and every operation of the controlling unit enjoys the advantageous effects elaborated in each of first to third embodiments.

As learned from the fact that the formula 16 is more simplified than the formula 13, making the structural arrangement of the imaging device as illustrated in FIG. 11 allows the circuit scale of the visible light amount detecting unit 1102 to be further minimized than the counterpart illustrated in FIG. 1 according to the first embodiment.

Fifth Embodiment

Figure 12:
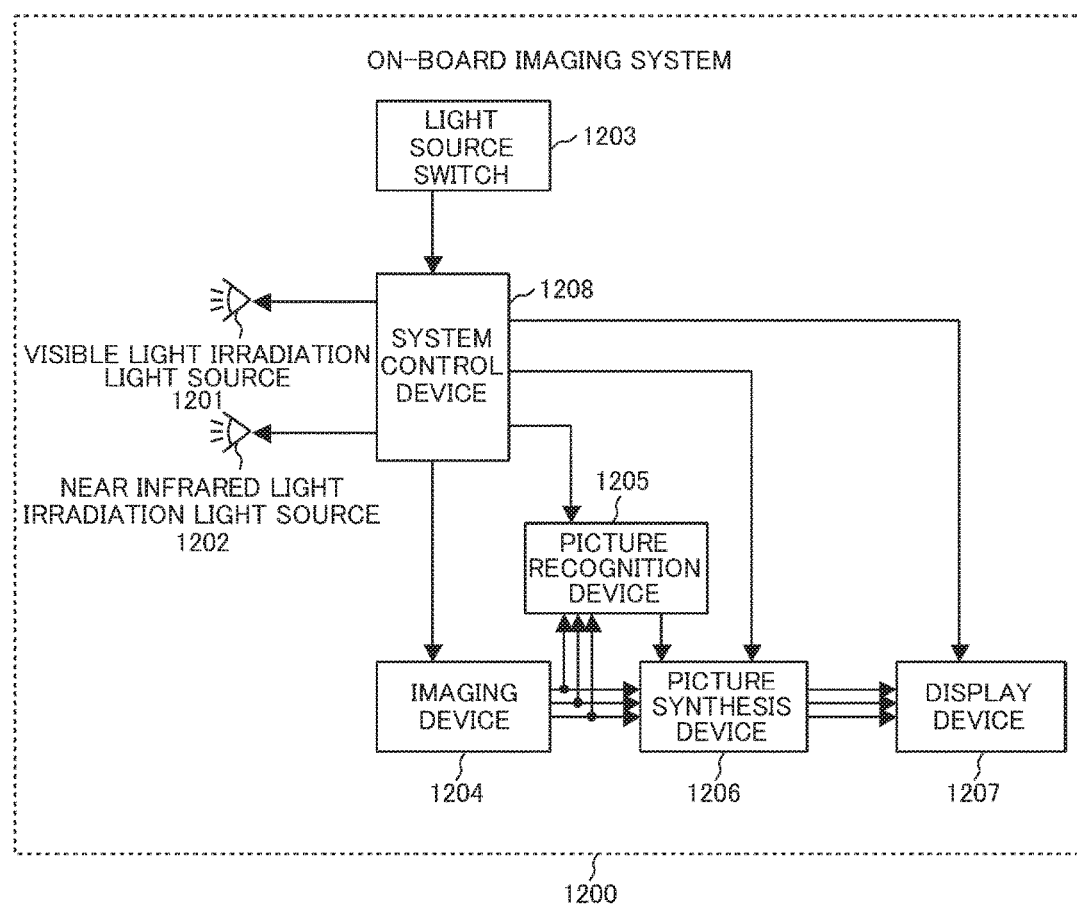
FIG. 12 is a view showing one exemplified arrangement of an on-board imaging system.

FIG. 12 shows the exemplified arrangement of an on-board imaging system according to the fifth embodiment.

The on-board imaging system 1200 comprises: a visible light irradiation light source 1201; a near infrared light irradiation light source 1202; a light source switch 1203; an imaging device 1204; a picture recognition device 1205; a picture synthesis device 1206; a display device 1207; and a system control device 1208 where appropriate.

The visible light irradiation light source 1201 is the light source to irradiate light containing visible light region components and includes a white Light-Emitting Diode (hereinafter, referred to as LED) to irradiate light of the visible light region and a halogen lamp to irradiate light of both of the visible and near infrared light regions, by way of some examples. In the present embodiment, a halogen lamp is exemplified for explanation.

The near infrared light irradiation light source 1202 is the light source to irradiate light of the near infrared light region, which includes a LED to irradiate light whose wavelengths range from 650 nm to 1200 nm, for example.

The light source switch 1203 is the switch to turn on/off the irradiation of the visible light irradiation light source 1201 and the near infrared light irradiation light source 1202, in which the ON/OFF signal of the respective light sources is outputted to the system control device 1208.

The imaging device 1204 captures an image of a target object over the visible and near infrared regions and outputs a luminance signal, a first color difference signal and a second color difference signal. The imaging device 1204 has the same arrangement as the counterparts exemplified in the first to fourth embodiments. Further, the imaging device 1204 inputs a control signal outputted from the system control device 1208 to the controlling unit 120.

The picture recognition device 1205 recognizes a target object with the use of the luminance signal, the first and second color difference signals outputted from the imaging device 1204 so as to output a recognition result signal according to the recognition result.

The picture synthesis device 1206 outputs the luminance signal, the first and second color difference signals in which the picture recognition result is overlapped over the luminance signal, the first and second color difference signals outputted from the imaging device 1204 based on the recognition result signal outputted from the picture recognition device 1205.

The display device 1207 is the device to display the luminance signal, the first and second color difference signals outputted from the picture synthesis device 1206, which includes a liquid crystal display, for example.

The on-board imaging system 1200 is intended for being carried on such vehicles as autos and trains. For example, in terms of an automobile, the visible light irradiation light source 1201 corresponds to a low beam while the near infrared light irradiation light source 1201 corresponding to a high beam. The light source switch 1203 corresponds to the selector switch manipulated by a driver to switch over a high beam and a low beam. In the present embodiment, when the driver aligns the light source switch 1203 to 'Low', only the visible light irradiation light source 1201 is turned on while when aligning the same to 'High', both the visible light irradiation light source 1201 and the near infrared light irradiation light source 1202 are turned on; and when aligning the same to 'OFF', neither of the visible light irradiation light source 1201 nor the near infrared light irradiation light source 1202 is turned on.

Figure 13:
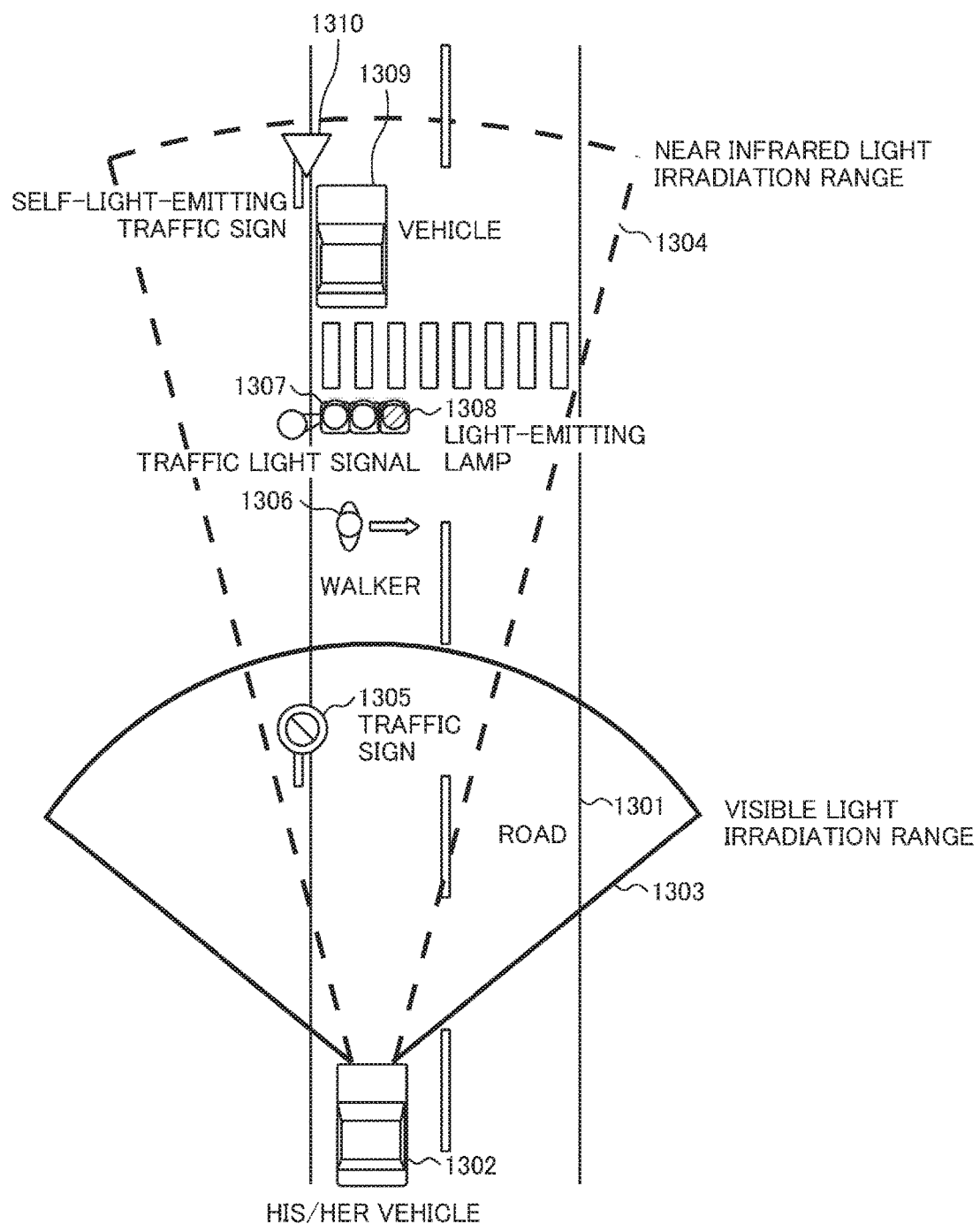
FIG. 13 is a view explaining a certain traffic scene.

FIG. 13 is a view explaining a certain traffic scene according to the present embodiment. Hereafter, with one scene during the night illustrated in FIG. 11 in use, one advantageous effect brought by the on-board imaging system according to the present embodiment is explained. According to the illustration of FIG. 13, his/her vehicle 1302 in consideration is running on the road 1301. Viewed from his/her vehicle, light is irradiated from the visible light irradiation light source 1201 illustrated in FIG. 12 over the visible light irradiation range 1303 illustrated in FIG. 13 while light is irradiated from the near infrared light irradiation light source 1202 over the near infrared light irradiation range 1304 illustrated in FIG. 13. Within the visible light irradiation range 1303, a traffic sign 1305 exists. Further, within the near infrared light irradiation range 1304, a walker 1306, a traffic light 1307, a vehicle 1309 and a self-light emitting traffic sign 1310 exist. Moreover, the traffic light 1308 is in operation in which the light emitting lamp 1308 exists. In other words, supposing that the traffic light 1308 is the one generally used in Japan, for example, any one of red, yellow and green lamps is lighted or blinked.

Based on the traffic scene illustrated in FIG. 13, it is supposed herein that the driver in his/her vehicle visually observes pictures captured by some imaging devices mentioned later as the auxiliary means that helps him/her to check the traffic situations in front of his/her vehicle for the safety drive. As for the walker 1306, the traffic light 1307 and the vehicle 1309 among the target objects, it is required that they be grasped from pictures where they exist. Further, among the target objects, as with the traffic sign 1305, the light emitting lamp 1308 of the traffic light and the self-light emitting traffic sign 1310, it is supposed herein that it is required that they be grasped from pictures where they exist and what kind of color they have.

FIG. 14 illustrates the output picture captured from the traffic scene illustrated in FIG. 13 when the visible light region image capturing device is employed as the imaging device. Here, the visible light region image capturing device referred to herein is the imaging device by which the image of an object is captured in color over the visible light region and the reference of which is made to a commercially available color camera. With this imaging device, only the images of the target objects existing within the visible light irradiation range 1303 or the self-light emitting target objects can be captured in color. As illustrated in FIG. 14, the images of the walker 1306 and the vehicle 1309 are not captured by the same, so that how they are moving cannot be grasped from pictures. Further, as with the traffic light 1307, only the image of the light emitting lamp 1308 is captured, but it cannot be grasped from pictures that such lamp belongs to the traffic light 1307 because such traffic light is not fully covered by such lamp. As commented above, there is much to be desired when the visible light region image capturing device is employed as illustrated in FIG. 14.

Figure 15:
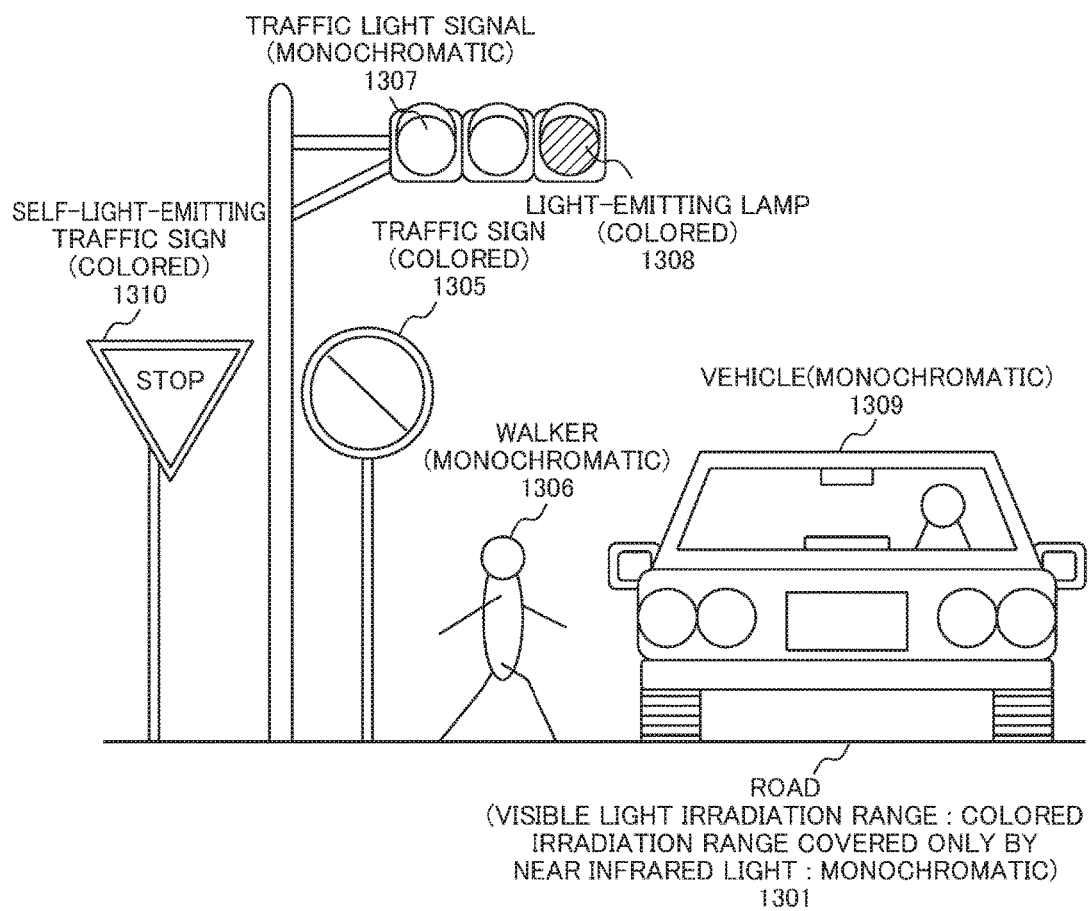
FIG. 15 is a view showing one example of a picture outputted from a near infrared light region image capturing device.

FIG. 15 illustrates the output picture captured from the traffic scene illustrated in FIG. 13 when the near infrared light region image capturing device is employed as the imaging device. Here, the near infrared region image capturing device is a monochromatic camera sensitive only to the near infrared light region or sensitive to both the near infrared light region and the visible light region and is called a night vision image capturing device alias. With this imaging device, the images of the target objects existing within the visible light irradiation range 1303 or within the near infrared light irradiation range 1304 or the self-light emitting target objects can be monochromatically captured. According to the illustration of FIG. 15, the images of the traffic sign 1305, the light emitting lamp 1308 of the traffic light and the self-light emitting traffic sign 1310 are monochromatically captured, so that their colors cannot be grasped from pictures. As commented above, there is much to be desired when the near infrared light region image capturing device is employed as illustrated in FIG. 15.

FIG. 16 illustrates the output picture captured from the traffic scene illustrated in FIG. 13 when the imaging device exemplified in each embodiment of the present invention is employed as the imaging device. In other words, FIG. 16 illustrates the output picture displayed on the display device 1207 when the on-board imaging system 1200 illustrated in FIG. 12 is carried on his/her vehicle 1302 illustrated in FIG. 13.

With this imaging device employed, the target objects whose images are captured over the visible light region result in being colored while the target objects whose images are captured over the near infrared region result in being monochromatic. According to the illustration of FIG. 16, as for the walker 1306, the traffic light 1307 and the vehicle 1309, where they exist can be grasped from pictures. Further, as with the traffic sign 1305, the light emitting lamp 1308 of the traffic light and the self-light emitting traffic sign 1310, where they exist and what kind of color they have can be grasped from pictures. Thus, by the pictures outputted from the imaging device 1200 being outputted via the picture synthesis device 1206 to the display device 1207 and displayed thereon, the driver can grasp from pictures where the target objects exist and what kind of color they have, so that it well assists in the driver driving his/her vehicle with safety.

Figure 17:
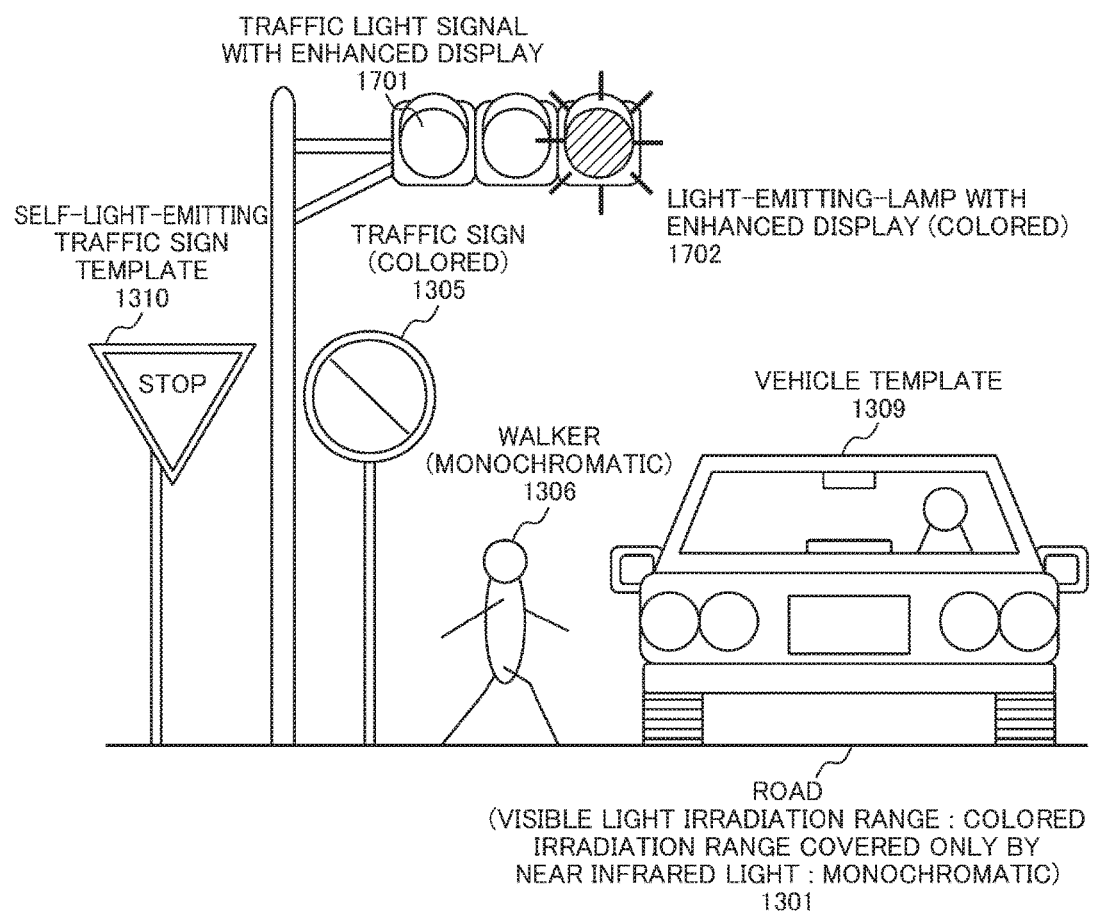
FIG. 17 is a view showing one example of a picture outputted from a picture synthesis device.

Furthermore, according to the present embodiment, as illustrated in FIG. 17, the entire image and color of the traffic light 1307 can be displayed with enhancement. FIG. 17 illustrates the output picture generated by the picture synthesis device 1206 according to the recognition result of the traffic light 1307 by means of the picture recognition device 1205. Among the picture signals outputted by the imaging device 1200 and shown in the illustration of FIG. 16, the traffic light 1307 and the light emitting lamp 1308 are emphatically displayed or turn out to be the traffic light 1701 with enhanced display and the light emitting lamp 1702 with enhanced display. What is referred to as emphatic display herein means the improvement of visual recognition through making the edges of the target objects shown thickened, enhancing the contrast of pictures or displaying them larger with the partial scaling.

According to the present embodiment, employing the imaging device 1204 permits the color and shape of the target object to be captured at the same time, so that the picture recognition device 1205 can recognize the color of the light emitting lamp 1308 in the case where the target object is the traffic light 1307, for example. By the output picture generated this way and illustrated in FIG. 17 being outputted to the display device 1207 and displayed thereon, it allows the driver to grasp from pictures where the target objects exist and their color with improved visibility, so that it assists in the driver driving his/her vehicle with safety.

Sixth Embodiment

Then, the sixth embodiment is explained as follow. The sixth embodiment concerns the on-board imaging system to output a different output picture with the same structural arrangement as the aforementioned on-board imaging system 1200.

Figure 18:
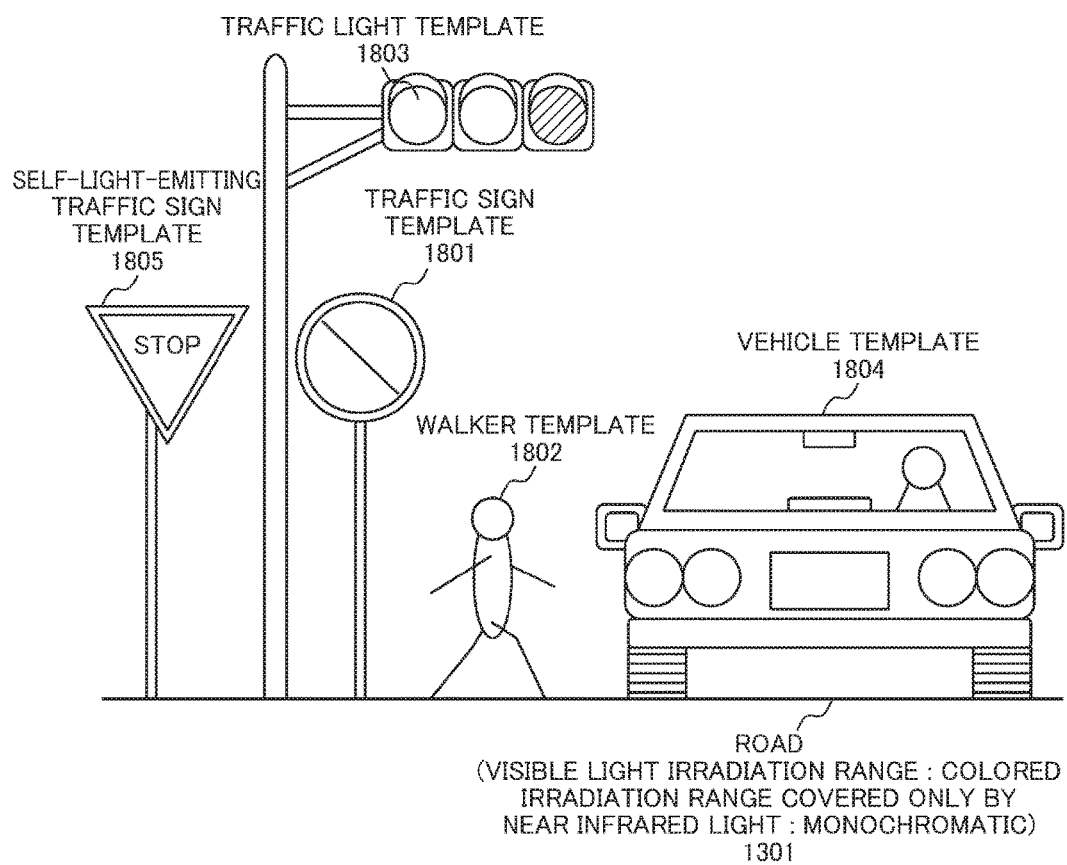
FIG. 18 is a view showing another example of a picture outputted from a picture synthesis device.

According to the present embodiment, as illustrated in FIG. 18, the target objects are converted into pictures called templates for display. The templates are the entire replacements by preliminarily prepared picture patterns of the pictures outputted by the imaging device 1200 or the partial replacements of such pictures with the sizes and angles of the output picture resulting from the images of the target objects being actually captured by the imaging device modified based on such preliminarily prepared picture patterns, the use of which templates are irrespective of the quality of the visibility or the low contrast of the original pictures for recognition and poor color reproducibility.

The picture recognition device 1206 recognizes the target objects from the output picture of the imaging device 1200 illustrated in FIG. 16 and outputs its recognition result to the picture synthesis device 1206. The picture synthesis device 1206 generates the output pictures in which the pictures outputted by the imaging device 1200 of some of the target objects are replaced with the traffic sign template 1801, the walker template 1802, the traffic light template 1803, the vehicle template 1804 and the self-light emitting template 1805. The output picture generated this way and illustrated in FIG. 18 is outputted to the display device 1207 so as to be displayed thereon, thereby, allowing the driver to grasp from pictures where they exist and their color with improved visibility, with the result that it assists in the driver driving his/her vehicle with safety. Herein, the example in which the entire target objects are converted into templates is illustrated, but it may be arranged such that some of the target objects are replaced with templates. For instance, it can be arranged such that only the target objects whose visibility deteriorates below the prescribed threshold value or whose visibility is poor are replaced with templates. Moreover, it may be arranged such that the pictures of the target objects illustrated in FIG. 17 are outputted while the corresponding templates are overlapped with such pictures for display every certain lapse of time.

It should be noted that the present invention is not limited to the aforementioned embodiment, but may be modified into various manners. For instance, the aforesaid mode for carrying out the invention is intended for explaining the present invention in details to facilitate the persons skilled in the art to understand the same, so that the present invention is not necessarily limited to the mode for carrying out the invention in which all the characteristic features mentioned herein are incorporated. Further, it shall be appreciated that some of the features in a certain embodiment may be substituted with those in the other embodiments or the features in the other embodiments may be added to those in a certain embodiment. Moreover, for some of the features in each embodiment, the other features may be added thereto, deleted therefrom and replaced therewith.

Further, with each of the abovementioned structural arrangements, a part of it or its entirety may be arranged with hardware or it may be arranged such that the programs are executed with a processor. As for control lines and data lines, what is considered essential for the sake of explanation is shown, so that the entire control and data lines are not necessarily shown in terms of a product. It is conceivable that most of the structural components are actually interconnected with one another.

REFERENCE SIGNS LIST

100 Imaging Device
101 Lens
102 Image Capturing Unit
103 (R+I) Signal Demosaicking Unit
104 (G+I) Signal Demosaicking Unit
105 (B+I) Signal Demosaicking Unit
106 I Signal Demosaicking Unit
107 Color Matrix Operation Unit
108 AWB Gain Unit
109 R Signal Gamma Operation Unit
110 G Signal Gamma Operation Unit
111 B Signal Gamma Operation Unit
112 Color Difference Operation Unit 1
113 Color Difference Operation Unit 2
114 Luminance Matrix Operation Unit
115 High Pass Enhancement Unit
116 Luminance Signal Gamma Operation Unit
117 Visible Light Amount Detecting Unit
118 Near Infrared Light Amount Detecting Unit
119 AWB Detecting Unit
120 Controlling Unit
121 I Subtraction unit
122 R Signal Matrix Operation Unit
123 G Signal Matrix Operation Unit
124 B Signal Matrix Operation Unit
201 (R+I) Pixel
202 (G+I) Pixel
203 I Pixel
204 (B+I) Pixel
301 Red Region (R) Component
302 Near Infrared Light Region (I) Component
303 Unrequired Wavelength Component
304 Unrequired Wavelength Component
305 Green Region (G) Component
306 Near Infrared Light Region (I) Component
307 Unrequired Wavelength Component
308 Unrequired Wavelength Component
309 Near Infrared Light Region (I) Component
310 Unrequired Wavelength Component
311 Red Region (R) Component
312 Near Infrared Light Region (I) Component
313 Unrequired Wavelength Component
401 Step 1
402 Step 2
403 Step 3
404 Step 4
405 Step 5
406 Step 6
501 krr (Color Matrix Coefficient) of Mat 1
502 krg (Color Matrix Coefficient) of Mat 1
503 krb (Color Matrix Coefficient) of Mat 1
504 ki1 (Subtraction Coefficient) of Mat 1
505 krr (Color Matrix Coefficient) of Mat 2
506 krg (Color Matrix Coefficient) of Mat 2
507 krb (Color Matrix Coefficient) of Mat 2
508 ki1 (Subtraction Coefficient) of Mat 2
509 krr (Color Matrix Coefficient) of Mat 3
510 krg (Color Matrix Coefficient) of Mat 3
511 krb (Color Matrix Coefficient) of Mat 3
512 ki1 (Subtraction Coefficient) of Mat 3
513 kgr (Color Matrix Coefficient) of Mat 1
514 kgg (Color Matrix Coefficient) of Mat 1
515 kgb (Color Matrix Coefficient) of Mat 1
516 ki2 (Subtraction Coefficient) of Mat 1
517 kgr (Color Matrix Coefficient) of Mat 2
518 kgg (Color Matrix Coefficient) of Mat 2
519 kgb (Color Matrix Coefficient) of Mat 2
520 ki2 (Subtraction Coefficient) of Mat 2
521 kgr (Color Matrix Coefficient) of Mat 3
522 kgg (Color Matrix Coefficient) of Mat 3
523 kgb (Color Matrix Coefficient) of Mat 3
524 ki2 (Subtraction Coefficient) of Mat 3
525 kbr (Color Matrix Coefficient) of Mat 1
526 kbg (Color Matrix Coefficient) of Mat 1
527 kbb (Color Matrix Coefficient) of Mat 1
528 ki3 (Subtraction Coefficient) of Mat 1
529 kbr (Color Matrix Coefficient) of Mat 2
530 kbg (Color Matrix Coefficient) of Mat 2
531 kbb (Color Matrix Coefficient) of Mat 2
532 ki3 (Subtraction Coefficient) of Mat 2
533 kbr (Color Matrix Coefficient) of Mat 3
534 kbg (Color Matrix Coefficient) of Mat 3
535 kbb (Color Matrix Coefficient) of Mat 3
536 ki3 (Subtraction Coefficient) of Mat 3
601 Color Difference Signal 1 Pb
602 Color Difference Signal 2 Pr
603 Original AWB Detecting Range
604 AWB Detecting Range after Correction
701 Step 1
702 Step 2
703 Step 3
704 Step 4
801 krr (Color Matrix Coefficient) of Mat 1
802 krg (Color Matrix Coefficient) of Mat 1
803 krb (Color Matrix Coefficient) of Mat 1
804 ki1 (Subtraction Coefficient) of Mat 1
805 krr (Color Matrix Coefficient) of Mat 2
806 krg (Color Matrix Coefficient) of Mat 2
807 krb (Color Matrix Coefficient) of Mat 2
808 ki1 (Subtraction Coefficient) of Mat 2
809 krr (Color Matrix Coefficient) of Mat 3
810 krg (Color Matrix Coefficient) of Mat 3
811 krb (Color Matrix Coefficient) of Mat 3
812 ki1 (Subtraction Coefficient) of Mat 3
813 kgr (Color Matrix Coefficient) of Mat 1
814 kgg (Color Matrix Coefficient) of Mat 1
815 kgb (Color Matrix Coefficient) of Mat 1
816 ki2 (Subtraction Coefficient) of Mat 1
817 kgr (Color Matrix Coefficient) of Mat 2
818 kgg (Color Matrix Coefficient) of Mat 2
819 kgb (Color Matrix Coefficient) of Mat 2
820 ki2 (Subtraction Coefficient) of Mat 2
821 kgr (Color Matrix Coefficient) of Mat 3
822 kgg (Color Matrix Coefficient) of Mat 3
823 kgb (Color Matrix Coefficient) of Mat 3
824 ki2 (Subtraction Coefficient) of Mat 3
825 kbr (Color Matrix Coefficient) of Mat 1
826 kbg (Color Matrix Coefficient) of Mat 1
827 kbb (Color Matrix Coefficient) of Mat 1
828 ki3 (Subtraction Coefficient) of Mat 1

829 kbr (Color Matrix Coefficient) of Mat 2
830 kbg (Color Matrix Coefficient) of Mat 2
831 kbb (Color Matrix Coefficient) of Mat 2
832 ki3 (Subtraction Coefficient) of Mat 2
833 kbr (Color Matrix Coefficient) of Mat 3
834 kbg (Color Matrix Coefficient) of Mat 3
835 kbb (Color Matrix Coefficient) of Mat 3
836 ki3 (Subtraction Coefficient) of Mat 3
901 Step 1
902 Step 2
903 Step 3
904 Step 4
905 Step 5
1001 Mat 1 (Color Matrix Coefficient and Subtraction Coefficient)
1002 Mat 2 (Color Matrix Coefficient and Subtraction Coefficient)
1003 Mat 3 (Color Matrix Coefficient and Subtraction Coefficient)
1004 Mat 4 (Color Matrix Coefficient and Subtraction Coefficient)
1005 Mat 5 (Color Matrix Coefficient and Subtraction Coefficient)
1100 Imaging Device
1101 Color Matrix Operation Unit
1102 Visible Light Amount Detecting Unit
1201 Visible Light Irradiation Light Source
1202 Near Infrared Light Irradiation Light Source
1203 Light Source Switch
1204 Imaging Device
1205 Picture Recognition Device
1206 Picture Synthesis Device
1207 Display Device
1208 System Control Device
1301 Road
1302 his/her Vehicle
1303 Visible Light Irradiation Range
1304 Near Infrared Light Irradiation Range
1305 Traffic Sign
1306 walker
1307 Traffic Light
1308 Light Emitting Lamp
1309 Vehicle
1310 Self-Light Emitting traffic Sign
1601 Traffic Light with Enhanced Display
1602 Light Emitting Lamp with Enhanced Display
1701 Traffic Sign Template
1702 Walker Template
1703 Traffic Light Template
1704 Vehicle Template

The invention claimed is:

1. An imaging device comprising:
an image sensor including a plurality of first pixels configured to sense visible light and near infrared light regions and a plurality of second pixels configured to sense the near infrared light region; and
a processor configured to:
calculate a first signal quantity of the visible light region based on signals output from the first and second pixels of the image sensor;
calculate a second signal quantity of the near infrared light region based on the signals output from the second pixels of the image sensor;
derive a plurality of color matrix coefficients and a plurality of subtraction coefficients based on a difference between the first signal quantity and the second signal quantity;
generate a plurality of first color signals from a plurality of first predetermined formulas based on the signals output from the first and second pixels of the image sensor and the plurality of derived color matrix coefficients; and
generate a plurality of second color signals from a plurality of second predetermined formulas based on the signals output from the first and second pixels of the image sensor and the plurality of derived subtraction coefficients,
wherein the plurality of first color signals are generated from the plurality of first predetermined formulas based on the plurality of second color signals and the plurality of derived color matrix coefficients, and
wherein an image is obtained based on the first color signals.

2. The imaging device according to claim 1, wherein the first predetermined formulas are:

$$R2 = krr2 \times (R+I) + krg2 \times (G+I) + krb2 \times (B+I) + kri2 \times I,$$

$$G2 = kgr2 \times (R+I) + kgg2 \times (G+I) + kgb2 \times (B+I) + kgi2 \times I,$$
and $$B2 = kbr2 \times (R+I) + kbg2 \times (G+I) + kbb2 \times (B+I) + kbi2 \times I,$$

where R2, G2 and B2 are the first color signals, (R+I) is a red color signal corresponding to a red visible light region sensed by the first pixels, (G+I) is a green color signal corresponding to a green visible light region sensed by the first pixels, (B+I) is a blue color signal corresponding to a blue visible light region sensed by the first pixels, I is a near infrared light signal corresponding to the near infrared light region sensed by the second pixels, and krr2, krg2, krb2, kri2, kgr2, kgg2, kgb2, kgi2, kbr2, kbg2, kbb2 and kbi2 are the color matrix coefficients.

3. The imaging device according to claim 1,
wherein the second predetermined formulas are:

$$R1 = (R+I) - ki1 \times I,$$

$$G1 = (G+I) - ki2 \times I, \text{ and}$$

$$B1 = (B+I) - ki3 \times I,$$

where R1, G1 and B1 are the second color signals, (R+I) is a red color signal corresponding to a red visible light region sensed by the first pixels, (G+I) is a green color signal corresponding to a green visible light region sensed by the first pixels, (B+I) is a blue color signal corresponding to a blue visible light region sensed by the first pixels, I is a near infrared light signal corresponding to the near infrared light region sensed by the second pixels, and ki1, ki2 and ki3 are the subtraction coefficients,
wherein the first predetermined formulas are:

$$R2 = krr \times R1 + krg \times G1 + krb \times B1,$$

$$G2 = kgr \times R1 + kgg \times G1 + kgb \times B1, \text{ and}$$

$$B2 = kbr \times R1 + kbg \times G1 + kbb \times B1,$$

where R2, G2 and B2 are the first color signals, R1, G1 and B1 are the second color signals, and krr, krg, krb, kgr, kgg, kgb, kbr, kbg and kbb are the color matrix coefficients.

4. The imaging device according to claim 1, wherein a plurality of predetermined color matrix coefficients are specified for a plurality of predetermined values of the first signal quantity, wherein the color matrix coefficients are derived by interpolating the color matrix coefficients from adjacent ones of the plurality of predetermined color matrix coefficients corresponding to the predetermined values adjacent to the calculated first signal quantity.

5. The imaging device according to claim 1, wherein a plurality of predetermined color matrix coefficients and a plurality of predetermined subtraction coefficients are specified for a plurality of predetermined difference values, and
wherein the color matrix coefficients and the subtraction coefficients are derived by interpolating the color matrix coefficients and the subtraction coefficients from adjacent ones of the plurality of predetermined color matrix coefficients and predetermined subtraction coefficients corresponding to the predetermined difference values adjacent to the difference between the first signal quantity and the second signal quantity.

6. An imaging method employing an imaging device provided with an image sensor comprising a plurality of first pixels configured to sense visible light and near infrared light regions and a plurality of second pixels configured to sense the near infrared light region, the method comprising:
calculating a first signal quantity of the visible light region based on signals output from the first and second pixels of the image sensor;
calculating a second signal quantity of the near infrared light region based on the signals output from the second pixels of the image sensor;
deriving a plurality of color matrix coefficients and a plurality of subtraction coefficients based on a difference between the first signal quantity and the second signal quantity;
generating a plurality of first color signals from a plurality of first predetermined formulas based on the signals output from the first and second pixels of the image sensor and the plurality of derived color matrix coefficients;
generating a plurality of second color signals from a plurality of second predetermined formulas based on the signals output from the first and second pixels of the image sensor and the plurality of derived subtraction coefficients,
wherein the plurality of first color signals are generated from the plurality of first predetermined formulas based on the plurality of second color signals and the plurality of derived color matrix coefficients, and
wherein an image is obtained based on the first color signals.

7. The imaging method according to claim 6, wherein the first predetermined formulas are:

$R2 = krr2 \times (R+I) + krg2 \times (G+I) + krb2 \times (B+I) + kri2 \times I,$ $G2 = kgr2 \times (R+I) + kgg2 \times (G+I) + kgb2 \times (B+I) + kgi2 \times I,$ and $B2 = kbr2 \times (R+I) + kbg2 \times (G+I) + kbb2 \times (B+I) + kbi2 \times I,$ where R2, G2 and B2 are the first color signals, (R+I) is a red color signal corresponding to a red visible light region sensed by the first pixels, (G+I) is a green color signal corresponding to a green visible light region sensed by the first pixels, (B+I) is a blue color signal corresponding to a blue visible light region sensed by the first pixels, I is a near infrared light signal corresponding to the near infrared light region sensed by the second pixels, and krr2, krg2, krb2, kri2, kgr2, kgg2, kgb2, kgi2, kbr2, kbg2, kbb2 and kbi2 are the color matrix coefficients.

8. The imaging method according to claim 6, wherein the second predetermined formulas are:

$R1 = (R+I) - ki1 \times I,$ $G1 = (G+I) - ki2 \times I,$ and $B1 = (B+I) - ki3 \times I,$ where R1, G1 and B1 are the second color signals, (R+I) is a red color signal corresponding to a red visible light region sensed by the first pixels, (G+I) is a green color signal corresponding to a green visible light region sensed by the first pixels, (B+I) is a blue color signal corresponding to a blue visible light region sensed by the first pixels, I is a near infrared light signal corresponding to the near infrared light region sensed by the second pixels, and ki1, ki2 and ki3 are the subtraction coefficients,
wherein the first predetermined formulas are:

$R2 = krr \times R1 + krg \times G1 + krb \times B1,$ $G2 = kgr \times R1 + kgg \times G1 + kgb \times B1,$ and $B2 = kbr \times R1 + kbg \times G1 + kbb \times B1,$ where R2, G2 and B2 are the first color signals, R1, G1 and B1 are the second color signals, and krr, krg, krb, kgr, kgg, kgb, kbr, kbg and kbb are the color matrix coefficients.

9. An on-board imaging system comprising:
a visible light irradiation light source to irradiate visible light;
a near infrared light irradiation light source to irradiate near infrared light;
an image sensor including a plurality of first pixels configured to sense visible light and near infrared light regions and a plurality of second pixels configured to sense the near infrared light region;
a processor configured to:
calculate a first signal quantity of the visible light region based on signals output from the first and second pixels of the image sensor,
calculate a second signal quantity of the near infrared light region based on the signals output from the second pixels of the image sensor,
derive a plurality of color matrix coefficients and a plurality of subtraction coefficients based on a difference between the first signal quantity and the second signal quantity,
generate a plurality of first color signals from a plurality of first predetermined formulas based on the signals output from the first and second pixels of the image sensor and the plurality of derived color matrix coefficients, and
generate a plurality of second color signals from a plurality of second predetermined formulas based on the signals output from the first and second pixels of the image sensor and the plurality of derived subtraction coefficients,
wherein the plurality of first color signals are generated from the plurality of first predetermined formulas based on the plurality of second color signals and the plurality of derived color matrix coefficients, and
wherein an image is obtained based on the first color signals;
a picture recognition device configured to recognize an object from the image outputted from the imaging device;

a picture synthesis device configured to output a synthesized picture resulting from the image output by the imaging device synthesized with a recognition result of the picture recognition device; and a display device configured to display the synthesized picture output by the picture synthesis device.

10. The on-board imaging system according to claim 9, wherein the first predetermined formulas are:

$R2=krr2\times(R+I)+krg2\times(G+I)+krb2\times(B+I)+kri2\times I,$ $G2=kgr2\times(R+I)+kgg2\times(G+I)+kgb2\times(B+I)+kgi2\times I,$ and $B2=krr2\times(R+I)+krg2\times(G+I)+krb2\times(B+I)+kbi2\times I,$ where R2, G2 and B2 are the first color signals, (R+I) is a red color signal corresponding to a red visible light region sensed by the first pixels, (G+I) is a green color signal corresponding to a green visible light region sensed by the first pixels, (B+I) is a blue color signal corresponding to a blue visible light region sensed by the first pixels, I is a near infrared light signal corresponding to the near infrared light region sensed by the second pixels, and krr2, krg2, krb2, kri2, kgr2, kgg2, kgb2, kgi2, kbr2, kbg2, kbb2 and kbi2 are the color matrix coefficients.

11. The on-board imaging system according to claim 9, wherein the second predetermined formulas are:

$R1=(R+I)-ki1\times I,$ $G1=(G+I)-ki2\times I,$ and $B1=(B+I)-ki3\times I,$ where R1, G1 and B1 are the second color signals, (R+I) is a red color signal corresponding to a red visible light region sensed by the first pixels, (G+I) is a green color signal corresponding to a green visible light region sensed by the first pixels, (B+I) is a blue color signal corresponding to a blue visible light region sensed by the first pixels, I is a near infrared light signal corresponding to the near infrared light region sensed by the second pixels, and ki1, ki2 and ki3 are the subtraction coefficients, wherein the first predetermined formulas are:

$R2=krr\times R1+krg\times G1+krb\times B1,$ $G2=kgr\times R1+kgg\times G1+kgb\times B1,$ and $B2=kbr\times R1+kbg\times G1+kbb\times B1,$ where R2, G2 and B2 are the first color signals, R1, G1 and B1 are the second color signals, and krr, krg, krb, kgr, kgg, kgb, kbr, kbg and kbb are the color matrix coefficients.

12. The on-board imaging system according to claim 9, wherein a plurality of predetermined color matrix coefficients are specified for a plurality of predetermined values of the first signal quantity, wherein the color matrix coefficients are derived by interpolating the color matrix coefficients from adjacent ones of the plurality of predetermined color matrix coefficients corresponding to the predetermined values adjacent to the calculated first signal quantity.

13. The on-board imaging system according to claim 9, wherein a plurality of predetermined color matrix coefficients and a plurality of predetermined subtraction coefficients are specified for a plurality of predetermined difference values, and wherein the color matrix coefficients and the subtraction coefficients are derived by interpolating the color matrix coefficients and the subtraction coefficients from adjacent ones of the plurality of predetermined color matrix coefficients and predetermined subtraction coefficients corresponding to the predetermined difference values adjacent to the difference between the first signal quantity and the second signal quantity.

14. The imaging method according to claim 6, wherein a plurality of predetermined color matrix coefficients are specified for a plurality of predetermined values of the first signal quantity, wherein the color matrix coefficients are derived by interpolating the color matrix coefficients from adjacent ones of the plurality of predetermined color matrix coefficients corresponding to the predetermined values adjacent to the calculated first signal quantity.

15. The imaging method according to claim 6, wherein a plurality of predetermined color matrix coefficients and a plurality of predetermined subtraction coefficients are specified for a plurality of predetermined difference values, and wherein the color matrix coefficients and the subtraction coefficients are derived by interpolating the color matrix coefficients and the subtraction coefficients from adjacent ones of the plurality of predetermined color matrix coefficients and predetermined subtraction coefficients corresponding to the predetermined difference values adjacent to the difference between the first signal quantity and the second signal quantity.

\* \* \* \* \*